(12) United States Patent
Nakayama et al.

(10) Patent No.: US 9,048,611 B2
(45) Date of Patent: Jun. 2, 2015

(54) WAVELENGTH CONVERSION DEVICE AND IMAGE DISPLAY DEVICE

(75) Inventors: Kenji Nakayama, Kumamoto (JP); Tetsuro Mizushima, Kumamoto (JP); Tatsuo Itoh, Osaka (JP); Hirohiko Oowaki, Fukuoka (JP); Tomohiro Matsuo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 14/000,499

(22) PCT Filed: Apr. 2, 2012

(86) PCT No.: PCT/JP2012/002262
§ 371 (c)(1),
(2), (4) Date: Aug. 20, 2013

(87) PCT Pub. No.: WO2012/137459
PCT Pub. Date: Oct. 11, 2012

(65) Prior Publication Data
US 2013/0329276 A1    Dec. 12, 2013

(30) Foreign Application Priority Data
Apr. 4, 2011    (JP) .................................. 2011-082481

(51) Int. Cl.
*G02F 1/35* (2006.01)
*H01S 3/10* (2006.01)
(Continued)

(52) U.S. Cl.
CPC .............. *H01S 3/0092* (2013.01); *H01S 3/005* (2013.01); *H01S 3/025* (2013.01); *H01S 3/0602* (2013.01); *H01S 3/08* (2013.01); *H01S 3/109* (2013.01); *H01S 3/2391* (2013.01); *G03B 21/204* (2013.01); *H01S 3/1673* (2013.01); *H01S 3/0621* (2013.01)

(58) Field of Classification Search
None
See application file for complete search history.

(56) References Cited

U.S. PATENT DOCUMENTS 5,063,566 A    11/1991  Dixon
5,243,611 A *  9/1993  Hyuga et al. .................... 372/22
(Continued)

FOREIGN PATENT DOCUMENTS

JP    4-229677    8/1992
JP    7-193310    7/1995
(Continued)

OTHER PUBLICATIONS

International Search Report issued Apr. 24, 2012 in International (PCT) Application No. PCT/JP2012/002262.
(Continued)

*Primary Examiner* — Hemang Sanghavi
(74) *Attorney, Agent, or Firm* — Wenderoth, Lind & Ponack L.L.P.

(57) ABSTRACT

The present application discloses a wavelength conversion device. The wavelength conversion device includes a light source for generating excitation light, a laser medium for generating fundamental light from the excitation light, a resonator mirror for forming a resonator for the fundamental light in cooperation with the laser medium, and a wavelength convertor for converting wavelength from the fundamental light into harmonic light. The wavelength convertor includes a first end surface inclined by an angle θ from a surface orthogonal to an optical axis of the resonator and a second end surface parallel to the first end surface.

14 Claims, 14 Drawing Sheets

(51) Int. Cl.
    *H01S 3/08*     (2006.01)
    *H01S 3/00*     (2006.01)
    *H01S 3/109*     (2006.01)
    *G03B 21/20*     (2006.01)
    *H01S 3/02*     (2006.01)
    *H01S 3/06*     (2006.01)
    *H01S 3/23*     (2006.01)
    *H01S 3/16*     (2006.01)

(56) References Cited

U.S. PATENT DOCUMENTS

| | | | | |
|---|---|---|---|---|
| 5,588,014 | A | * | 12/1996 | Okazaki et al. ............ 372/22 |
| 5,982,805 | A | * | 11/1999 | Kaneda ............ 372/98 |
| 2005/0238071 | A1 | | 10/2005 | Oka |
| 2006/0232517 | A1 | | 10/2006 | Park et al. |
| 2008/0137697 | A1 | | 6/2008 | Maeda et al. |
| 2010/0238959 | A1 | | 9/2010 | Yokoyama et al. |
| 2010/0309438 | A1 | | 12/2010 | Mizushima et al. |

FOREIGN PATENT DOCUMENTS

| | | |
|---|---|---|
| JP | 2000-307179 | 11/2000 |
| JP | 2006-100772 | 4/2006 |
| JP | 2006-294587 | 10/2006 |
| JP | 4144642 | 9/2008 |
| WO | 2009/047888 | 4/2009 |

OTHER PUBLICATIONS

Supplementary European Search Report issued Sep. 16, 2014 in corresponding European Application No. 12767755.7.

* cited by examiner

FIG. 11

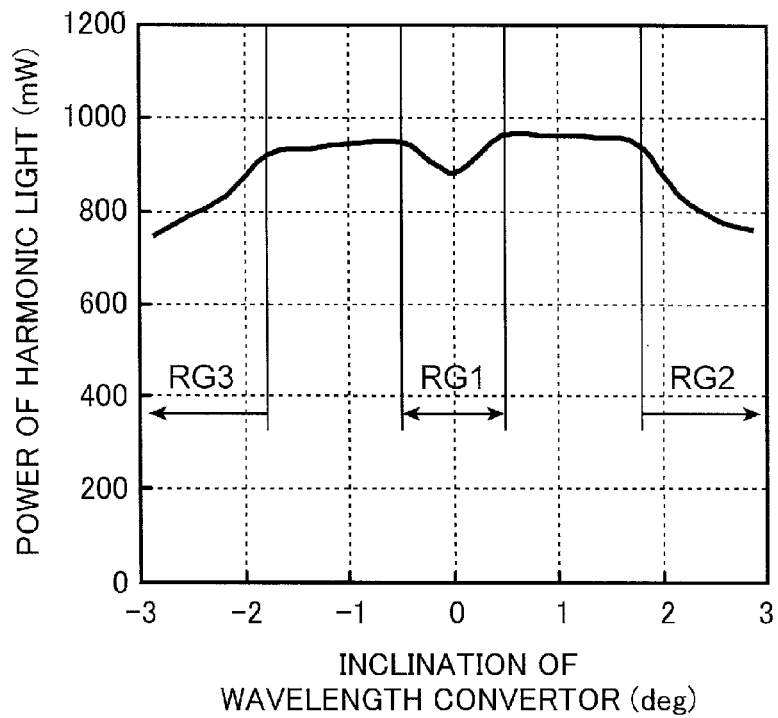

FIG. 12

| SPREADING ANGLE OF HARMONIC WAVE | 0.2 DEGREES |
|---|---|
| WAVELENGTH $\lambda$ OF FUNDAMENTAL LIGHT | 1064nm |
| RESONATOR LENGTH L | 8mm |
| CURVATURE RADIUS R OF CONCAVE MIRROR | 40mm |
| REFRACTIVE INDEX $n_1$ OF LASER MEDIUM | 2.15 |
| REFRACTIVE INDEX $n_2$ BETWEEN LASER MEDIUM AND WAVELENGTH CONVERTOR | 1 |
| LENGTH $L_1$ IN OPTICAL AXIS DIRECTION OF LASER MEDIUM | 2mm |
| LENGTH FROM LASER MEDIUM TO WAVELENGTH CONVERTOR | 3mm |

WAVELENGTH CONVERSION DEVICE AND IMAGE DISPLAY DEVICE

TECHNICAL FIELD

The present invention relates to a wavelength conversion device for converting wavelength from fundamental light into harmonic light and an image display device including the wavelength conversion device.

BACKGROUND ART

In recent years, image display devices such as projectors and liquid crystal display devices in which laser sources are used as light sources have been researched and developed. A laser source as an approximate ideal point light source may efficiently condense light in a narrow region. Therefore, the laser source contributes to a reduction in size of an optical system incorporated in an image display device. With the laser source, the image display device is downsized.

If linearly polarized laser light is used as backlight of a liquid crystal display device, the liquid crystal display device may use light very efficiently. Therefore, the liquid crystal display device may achieve low power consumption.

The liquid crystal display device includes a liquid crystal panel for displaying images. The liquid crystal panel spatially modulates a deflecting direction of linearly polarized light to display images. Therefore, the linearly polarized light is incident on the liquid crystal panel.

A lamp or an LED, which irradiates randomly polarized light, may be used as a light source of the liquid crystal display device. In this case, the liquid crystal display device includes a polarization filter configured to convert the randomly polarized light into linearly polarized light. However, the polarization filter absorbs or reflects a part of light from the light source.

If the light source configured to emit linearly polarized laser light is used as a light source of a liquid crystal display device as described above, the liquid crystal display device does not require the polarization filter. Unless the liquid crystal display device includes the polarization filter, the polarization filter causes little optical loss. Therefore, the liquid crystal display device may efficiently use light to achieve low power consumption.

Typically, the image display device creates images with the three primary colors. Therefore, the image display device includes a red laser source configured to emit light of a red hue, a green laser source configured to emit light of a green hue, and a blue laser source configured to emit light of a blue hue. Typically, semiconductor lasers are used as the red and blue laser sources. Red and blue laser beams are generated at high power by the semiconductor lasers.

Unlike the red and blue laser sources, the green laser source has difficulties in materials for generating laser light. In the current situation, there is no material composition which generates green laser light at high power and is practically applicable to the semiconductor laser.

A wavelength conversion device is proposed to generate high power green laser light by means of a combination of a solid-state laser device and a wavelength conversion device, instead of the semiconductor laser emitting green laser light. The solid-state laser device generates fundamental light. The wavelength conversion device converts wavelength from the fundamental light into harmonic light to generate high power green laser light (c.f. Patent Documents 1 and 2). Development for mass production is in progress for wavelength conversion devices. It should be noted that the solid-state laser device means a structure for generating laser light using a laser medium. A solid-state laser device of a semiconductor laser excitation system excited by a semiconductor laser is exemplified as the solid-state laser device.

Patent Document 1: JP 4,144,642 B
Patent Document 2: WO 2009/047888

SUMMARY OF THE INVENTION

The wavelength conversion device may generate green laser light but have problems in wavelength conversion efficiency.

The following disclosure contributes to achievement of high wavelength conversion efficiency.

In the context of the following various embodiments, a wavelength conversion device is disclosed. The wavelength conversion device includes: a light source configured to generate excitation light; a laser medium configured to generate fundamental light from the excitation light; a resonator mirror configured to form a resonator for the fundamental light in cooperation with the laser medium; and a wavelength convertor configured to convert wavelength from the fundamental light into harmonic light. The wavelength convertor includes a first end surface inclined by an angle $\theta$ from a surface orthogonal to an optical axis of the resonator, and a second end surface parallel to the first end surface. The angle $\theta$ is set in a specific range defined by the formulas described in the context of the following embodiments.

The wavelength conversion device may efficiently convert wavelength from the fundamental light into the harmonic light.

Objects, features and advantages of the present invention become clearer by the following detailed description and the accompanying drawings.

BRIEF DESCRIPTION OF THE DRAWINGS

FIG. 11 is a graph representing a relationship between the power of the harmonic light and the inclination angle.

FIG. 12 is a table representing exemplary numerical values substituted in parameters in a calculation for an angular range defined by formulas.

DESCRIPTION OF THE PREFERRED EMBODIMENTS (New Problems about Wavelength Conversion Device)

The inventors figured out new problems about wavelength conversion devices. The following various embodiments appropriately solve the problems found by the inventors.

Figure 1:
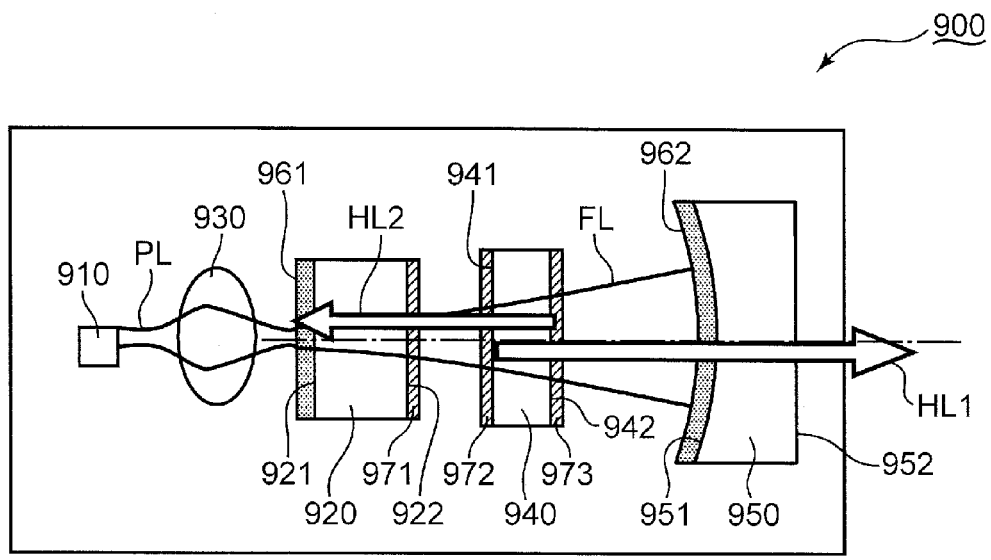
FIG. 1 is a schematic plan view of a wavelength conversion device involving problems about wavelength conversion efficiency.

FIG. 1 is a schematic plan view of a wavelength conversion device 900. Problems involved in the wavelength conversion device 900 are described with reference to FIG. 1.

The wavelength conversion device 900 includes a laser source 910 configured to generate excitation light PL and a laser medium 920 configured to generate fundamental light FL from the excitation light PL. The wavelength conversion device 900 further includes a condensing lens 930 situated between the laser source 910 and the laser medium 920. The condensing lens 930 condenses the excitation light PL toward the laser medium 920. Accordingly, the laser medium 920 may efficiently generate the fundamental light FL from the excitation light PL.

The wavelength conversion device 900 includes a wavelength convertor 940 and a concave mirror 950. The wavelength convertor 940 is situated between the concave mirror 950 and the laser medium 920.

The concave mirror 950 includes a concave surface 951, which faces the wavelength convertor 940, and an emission surface 952 opposite to the concave surface 951. The laser medium 920 includes an incident end surface 921, which the excitation light PL enters, and an emission end surface 922 opposite to the incident end surface 921. The wavelength conversion device 900 further includes a first resonator mirror 961 attached to the incident end surface 921 and a second resonator mirror 962 attached to the concave surface 951.

As described above, the excitation light PL emitted from the laser source 910 is condensed by the condensing lens 930. The condensed excitation light PL is incident on the laser medium 920. The laser medium 920 absorbs the excitation light PL to generate the fundamental light FL. The fundamental light FL travels back and forth between the first and second resonator mirrors 961, 962.

The wavelength convertor 940 is situated between the first and second resonator mirrors 961, 962. The wavelength convertor 940 converts wavelength from the fundamental light FL traveling back and forth between the first and second resonator mirrors 961, 962 into first harmonic light HL1 propagating from the wavelength convertor 940 to the concave mirror 950 and second harmonic light HL2 propagating from the wavelength convertor 940 to the laser medium 920.

An increase in power of the fundamental light FL results in an increase in power of the first and second harmonic lights HL1, HL2. If loss of the fundamental light FL is reduced between the first and second resonator mirrors 961, 962, the power of the fundamental light FL increases.

The wavelength convertor 940 includes a first end surface 941, which faces the laser medium 920, and a second end surface 942, which faces the concave mirror 950. The wavelength conversion device 900 further includes a first transmission film 971 formed on the emission end surface 922 of the laser medium 920, a second transmission film 972 formed on the first end surface 941 of the wavelength convertor 940, and a third transmission film 973 formed on the second end surface 942 of the wavelength convertor 940. The first transmission film 971 suppresses reflection of the fundamental light FL on the emission end surface 922 of the laser medium 920. The second transmission film 972 suppresses reflection of the fundamental light FL on the first end surface 941 of the wavelength convertor 940. The third transmission film 973 suppresses reflection of the fundamental light FL on the second end surface 942 of the wavelength convertor 940. Therefore, the first to third transmission films 971, 972, 973 contribute to a reduction in resultant loss from reflection of the fundamental light FL between the first and second resonator mirrors 961, 962.

As described above, the fundamental light FL travels back and forth between the first and second resonator mirrors 961, 962 to cause the first and second harmonic lights HL1, HL2. The first harmonic light HL1 is appropriately emitted from the wavelength conversion device 900 through the concave mirror 950. The second harmonic light HL2 passes through the laser medium 920 and is emitted from a resonator formed by the first and second resonator mirrors 961, 962. However, since there are the condensing lens 930 and the laser source 910 on the optical path of the second harmonic light HL2, the second harmonic light HL2 is less likely to be emitted from the wavelength conversion device 900.

If a reflection film for reflecting the second harmonic light HL2 is formed on the first resonator mirror 961, the second harmonic light HL2 is reflected toward the concave mirror 950. Accordingly, the second harmonic light HL2 is appropriately emitted from the wavelength conversion device 900. The laser medium 920 absorbs a part of the second harmonic light HL2 propagating toward the concave mirror 950. Therefore, the part of the second harmonic light HL2 absorbed by the laser medium 920 is not emitted from the wavelength conversion device 900.

According to the disclosure of Patent Document 1, the second harmonic light HL2 may be emitted from the wavelength conversion device 900 by means of a dichroic mirror and a return mirror situated between the first and second resonator mirrors 961, 962. Consequently, under appropriate arrangement of the dichroic mirror and the return lens between the first and second resonator mirrors 961, 962, the second harmonic light HL2 is emitted from the wavelength conversion device 900 without obstruction by the condensing lens 930 and the laser source 910.

The dichroic mirror situated between the first and second resonator mirrors 961, 962 absorbs and/or scatters the fundamental light FL. The absorption and/or scattering of the fundamental light FL because of the dichroic mirror increases loss of the fundamental light FL traveling back and forth between the first and second resonator mirrors 961, 962. Therefore, the power of the fundamental light FL decreases. As described above, if the power of the fundamental light FL decreases, the power of the first and second harmonic lights HL1, HL2 converted from the fundamental light FL also decrease.

As a result of the addition of the dichroic mirror and the return lens, the wavelength conversion device 900 becomes structurally complicated. Accordingly, the wavelength conversion device 900 is increased in size. The addition of the dichroic mirror and the return lens means an increase in a number of components of the wavelength conversion device 900. Therefore, manufacturing costs for the wavelength conversion device 900 increases.

A reflection film for reflecting the second harmonic light HL2 may be formed on the emission end surface 922 of the laser medium 920. The reflection film formed on the emission end surface 922 reflects the second harmonic light HL2 toward the concave mirror 950. Accordingly, the second harmonic light HL2 is appropriately emitted from the wavelength conversion device 900.

There is the wavelength convertor 940 on the optical path of the second harmonic light HL2 reflected on the emission end surface 922 of the laser medium 920. While the second harmonic light HL2 passes through the wavelength convertor 940, the wavelength convertor 940 converts the second harmonic light HL2 into the fundamental light FL (hereinafter referred to as "inverse conversion").

Interference between the fundamental light caused by the inverse conversion process (hereinafter referred to as "inversely converted light") and the fundamental light FL generated by the laser medium 920 reduces the power of the fundamental light FL.

According to the disclosure of Patent Document 2, the wavelength convertor 940 may be inclined from the optical path of the fundamental light FL traveling between the first and second resonator mirrors 961, 962. Accordingly, optical paths of the fundamental light FL and the inversely converted light generated from the second harmonic light HL2 are shifted as appropriate. As a result of the shift of the optical paths, there is little interference between the inversely converted light generated from the second harmonic light HL2 and the fundamental light FL. Consequently, the second harmonic light HL2 is efficiently emitted from the wavelength conversion device 900.

The inclination angle of the wavelength convertor 940 has been set without taking account of a relationship between the inclination angle of the wavelength convertor 940 and the power of the first and second harmonic lights HL1, HL2. An existing conventional idea about the setting of the inclination angle of the wavelength convertor 940 is described below.

If the wavelength convertor 940 is inclined from the optical axis defined between the first and second resonator mirrors 961, 962, wavelength conversion efficiency of the wavelength convertor 940 falls. However, since the first and second resonator mirrors 961, 962 reflect the fundamental light FL, the power of the fundamental light FL increases. It has been considered in the conventional idea that the inclination of the wavelength convertor 940 inserted between the first and second resonator mirrors 961, 962 causes tiny loss. It has been also considered in the conventional idea that the fall in the wavelength conversion efficiency because of the inclination of the wavelength convertor 940 is negligible under high power of the fundamental light FL.

As described above, the wavelength conversion device 900 includes the resonator formed by the first and second resonator mirrors 961, 962. If the wavelength convertor 940 situated in the resonator efficiently converts the fundamental light FL into the first and second harmonic lights HL1, HL2, the power of the fundamental light FL in the resonator decreases. If the wavelength convertor 940 is inclined from the optical axis of the resonator, the wavelength conversion efficiency of the wavelength convertor 940 falls. Because of the low wavelength conversion efficiency, the fundamental light FL is not efficiently converted into the first and second harmonic lights HL1, HL2. Therefore, the power of the fundamental light FL in the resonator maintains a high level. Since the power of the fundamental light FL converted into the first and second harmonic lights HL1, HL2 is maintained at the high level, the power of the first and second harmonic lights HL1, HL2 also increases.

According to the conventional idea, there is a wide range of appropriate setting for the inclination angle of the wavelength convertor 940 of the wavelength conversion device 900, which includes the resonator formed with the first and second resonator mirrors 961, 962. Therefore, it has been considered that the wavelength convertor 940 may be fixed by means of general mechanical methods.

As a result of the following experiments by the inventors, the inventors figured out that there is a close correlation between the wavelength convertor 940 and the harmonic lights (the first and second harmonic lights HL1, HL2). According to the inventors, unlike the conventional idea, power characteristics of the fundamental light FL greatly depend on the inclination angle of the wavelength convertor 940. In short, in comparison to the power fluctuation expected on the basis of the conventional idea, the inclination angle of the wavelength convertor 940 is a factor to greatly change the power of the harmonic lights.

The inventors deeply studied a cause of the change in the power of the fundamental light FL. Eventually, the inventors figured out that the etalon effect due to the wavelength convertor 940 affects the change in the power of the fundamental light FL.

The etalon effect is a phenomenon observed for light which traverses a pair of parallel surfaces. If a wavelength of the light has nodes at the paired surfaces (an incident end surface and an emission end surface), transmission loss of the light having the wavelength is reduced. For lights having other wavelengths, a reduction in transmission loss is not observed.

If the first end surface 941 of the wavelength convertor 940 is parallel to the second end surface 942, transmission loss of a specific wavelength passing the wavelength convertor 940 is reduced by the etalon effect. It should be noted that the term "parallel" in this embodiment does not mean a mathematically perfect parallel state but means a state in which the paired surfaces are parallel enough to cause the etalon effect.

Light having other wavelength than the specific wavelength is reflected by the first and second end surfaces 941, 942 and travels to the first or second resonator mirror 961, 962. According to the inventors, light having the other wavelength than the specific wavelength is effectively utilized if there is the inclination angle of the wavelength convertor 940 set under conditions represented by the following various formulas.

(First Embodiment)

Figure 2:
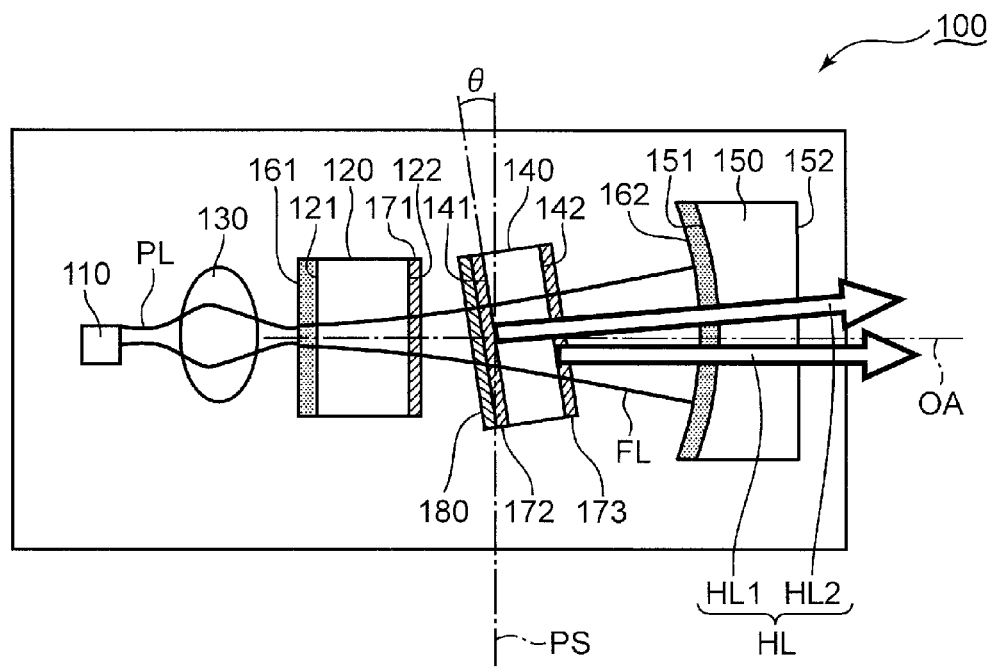
FIG. 2 is a schematic plan view of a wavelength conversion device according to the first embodiment.

FIG. 2 is a schematic plan view of a wavelength conversion device 100 according to the first embodiment. The wavelength conversion device 100 is described with reference to FIG. 2.

The wavelength conversion device 100 includes a laser source 110 configured to generate the excitation light PL. In this embodiment, a semiconductor laser is used as the laser source 110. The wavelength of the excitation light PL emitted from the laser source 110 is, for example, about 808 nm. In this embodiment, the laser source 110 is exemplified as the light source.

The wavelength conversion device 100 further includes a condensing lens 130 configured to receive the excitation light PL emitted from the laser source 110. For example, a lens capable of condensing light such as a ball lens is used as the condensing lens 130.

The wavelength conversion device 100 further includes a laser medium 120 configured to receive the excitation light PL condensed by the condensing lens 130. The condensing lens 130 condenses the excitation light PL on the laser medium 120.

Neodymium (hereinafter abbreviated as "Nd")-doped Yttrium Vanadate (hereinafter referred to as "$YVO_4$") is exemplified as the laser medium 120. In the following description, Nd-doped $YVO_4$ is referred to as "Nd:$YVO_4$".

The laser medium 120 absorbs a laser beam in an 800 nm band (i.e. the excitation light PL). Accordingly, the laser medium 120 generates light having a wavelength of 1064 nm. In this embodiment, the light having the wavelength of 1064 nm is used as the fundamental light FL.

The wavelength conversion device 100 further includes a concave mirror 150. The concave mirror 150 includes a concave surface 151, which faces the laser medium 120, and an emission surface 152 opposite to the concave surface 151. The laser medium 120 includes a flat incident end surface 121 which the excitation light PL enters and a flat emission end surface 122 from which the fundamental light FL is emitted.

The wavelength conversion device 100 further includes a reflection film 161 covering the incident end surface 121 of the laser medium 120 and a reflection film 162 covering the concave surface 151 of the concave mirror 150. The reflection films 161, 162 reflect the fundamental light FL. Therefore, the fundamental light FL travels back and forth between the reflection films 161, 162. Consequently, the reflection films 161, 162 function as a resonator for the fundamental light FL generated by the laser medium 120. It should be noted that there is the smallest beam diameter of the fundamental light FL on the incident end surface 121. In this embodiment, the reflection films 161, 162 are exemplified as the resonator mirror.

In this embodiment, the reflection films 161, 162 have reflectance no less than 95% for the fundamental light FL. Accordingly, the fundamental light FL is appropriately confined in the resonator formed from the reflection films 161, 162.

The wavelength conversion device 100 further includes a transmission film 171 covering the emission end surface 122. The transmission film 171 has, for example, transmittance no less than 95% for the fundamental light FL. Accordingly, there may be little loss of the fundamental light FL in the resonator.

The wavelength conversion device 100 further includes a wavelength convertor 140 which converts the wavelength of the fundamental light FL to generate the harmonic light HL. The wavelength convertor 140 is inserted between the laser medium 120 and the concave mirror 150. The wavelength convertor 140 converts the fundamental light FL traveling back and forth in the resonator into the harmonic light HL. In this embodiment, the wavelength convertor 140 generates the harmonic light HL which is about 532 nm in wavelength.

For example, the wavelength convertor 140 is formed from a ferroelectric crystal substance doped with magnesium (hereinafter referred to as "Mg"). Lithium niobate (hereinafter referred to as "LN") may be used as the ferroelectric crystal substance. A polarization-reversed region is formed in the wavelength convertor 140. When the fundamental light FL passes the polarization-reversed region, the harmonic light HL is generated.

FIG. 2 shows the optical axis OA of the resonator and the surface PS orthogonal to the optical axis OA. The wavelength convertor 140 includes a first end surface 141, which faces the laser medium 120, and a second end surface 142 opposite to the first end surface 141. The second end surface 142 faces the concave mirror 150. The first end surface 141 is inclined by an angle θ from the surface PS. The second end surface 142 is parallel to the first end surface 141. It should be noted that the term "parallel" used in this disclosure does not always mean that the first and second end surfaces 141, 142 are mathematically perfectly parallel. The term "parallel" used in this disclosure also means that the first and second end surfaces 141, 142 are parallel enough to cause the etalon effect. A degree of parallelization between the first and second end surfaces 141, 142 may be set to no more than 0.2 degrees. If the first and second end surfaces 141, 142 are formed at the degree of parallelization no more than 0.2 degrees, high conversion efficiency is achieved with the etalon effect. It should be noted that the angle θ is described below.

The wavelength conversion device 100 further includes a transmission film 172 covering the first end surface 141 and a transmission film 173 covering the second end surface 142. For example, the transmission films 172, 173 may have transmittance no less than 99.7% for the fundamental light FL. Accordingly, there is little loss of the fundamental light FL traveling back and forth in the resonator.

When the fundamental light FL traveling back and forth between the reflection films 161, 162 transmits through the wavelength convertor 140, the first harmonic light HL1 traveling from the wavelength convertor 140 to the concave mirror 150 and the second harmonic light HL2 traveling from the wavelength convertor 140 to the laser medium 120 are generated as the harmonic light HL. The wavelength conversion device 100 further includes a reflection film 180 covering the first end surface 141 of the wavelength convertor 140 together with the transmission film 172.

The reflection film 180 reflects the second harmonic light HL2 generated by the wavelength convertor 140 toward the concave mirror 150. Therefore, the reflection film 180 prevents the second harmonic light HL2 from entering the laser medium 120 which absorbs the harmonic light HL. In this embodiment, since the reflection film 180 prevents the second harmonic light HL2 from entering the laser medium 120, the second harmonic light HL2 is efficiently emitted from the wavelength conversion device 100.

As described above, the first end surface 141 is inclined by the angle θ from the surface PS. Accordingly, the optical path of the second harmonic light HL2 is shifted from the optical path of the first harmonic light HL1.

(Inclination of Wavelength Convertor)

Figure 3:
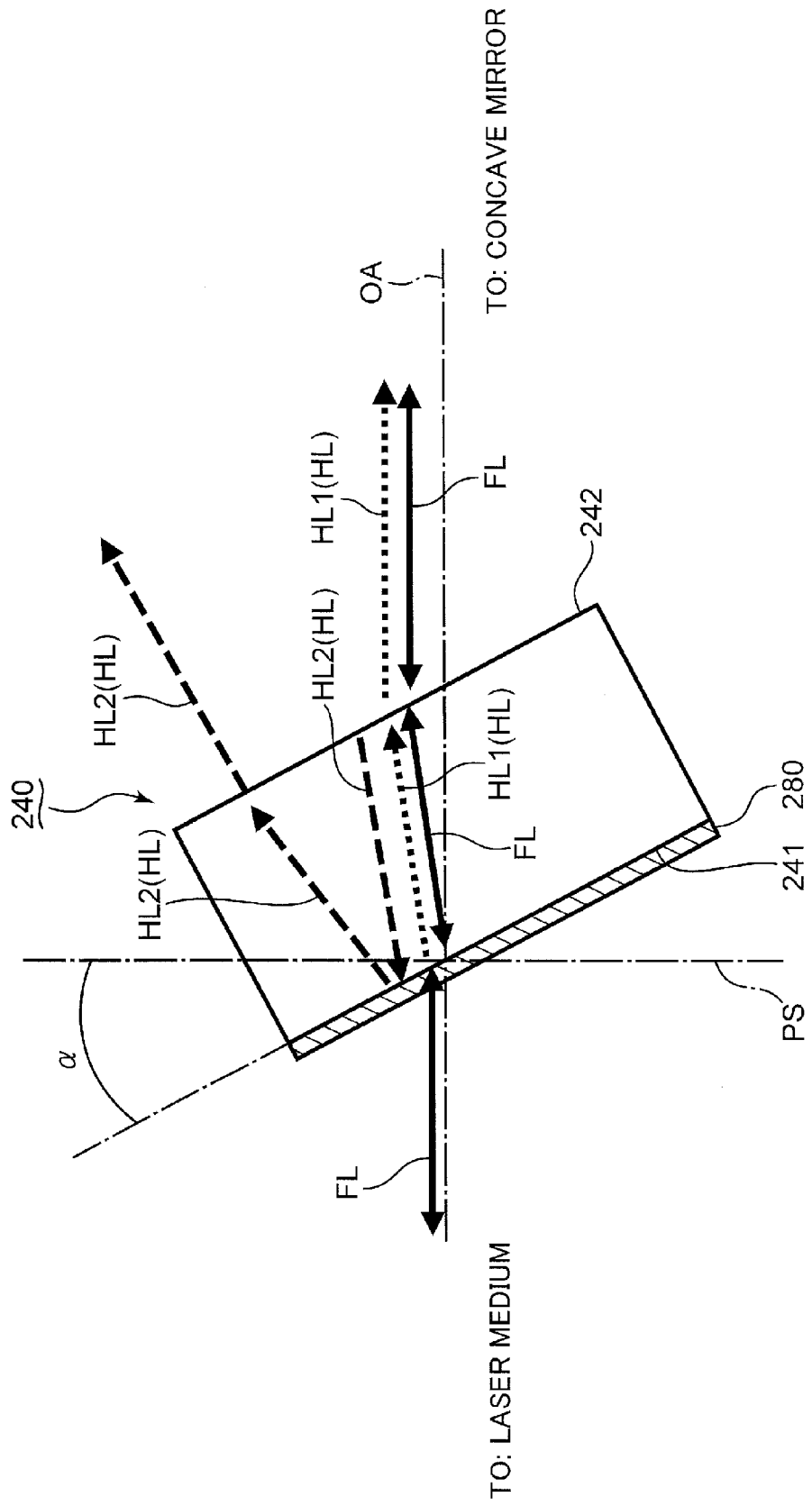
FIG. 3 is a schematic view of a wavelength convertor inclined from a surface perpendicular to the optical axis of a resonator.

FIG. 3 shows a wavelength convertor 240 inclining from the surface PS perpendicular to the optical axis OA of the resonator. It should be noted that the wavelength convertor 240 is inserted into a resonator having the same structure as the resonator described with reference to FIG. 2. Therefore, advantageous effects of the wavelength convertor 240 described with reference to FIG. 3 is applied to the wavelength convertor 140 described with reference to FIG. 2.

The wavelength convertor 240 includes a first end surface 241, which faces a laser medium, and a second end surface 242, which faces a concave mirror. The first end surface 241 is inclined at an angle α from the surface PS.

The fundamental light FL traveling back and forth between the laser medium and the concave mirror passes through the wavelength convertor 240. The wavelength convertor 240 converts the fundamental light FL propagating toward the concave mirror into the first harmonic light HL1 as the harmonic light HL. The wavelength convertor 240 converts the fundamental light FL propagating toward the laser medium into the second harmonic light HL2 as the harmonic light HL.

FIG. 3 shows a reflection film 280 covering the first end surface 241. The second harmonic light HL2 traveling to the laser medium is reflected by the reflection film 280. Accordingly, the second harmonic light HL2 propagates to the concave mirror.

In wavelength conversion processes performed by the wavelength convertor 240, the fundamental light FL is converted into the first and second harmonic lights HL1, HL2. However, a part of the first and second harmonic lights HL1, HL2 may be converted into the fundamental light FL in the wavelength convertor 240. The wavelength conversion process from the harmonic light HL into the fundamental light FL is referred to as "inverse conversion" in the following description.

If an optical path of the fundamental light inversely converted from the second harmonic light HL2 (hereinafter referred to as "inversely converted light") overlaps an optical path of the fundamental light FL, the inversely converted light interferes with the fundamental light FL to make the power of the fundamental light FL unstable. The unstable power of the fundamental light FL causes a power drop of the fundamental light FL. The power drop of the fundamental light FL results in a power drop of the harmonic light HL.

If the first end surface 241 of the wavelength convertor 240 is inclined from the surface PS, the optical path of the inversely converted light shifts from the optical path of the fundamental light FL. Therefore, there is little interference between the inversely converted light and the fundamental light FL. In addition, since the optical path of the second harmonic light HL2 is separated from the optical path of the first harmonic light HL1, there is little interference between the first and second harmonic lights HL1, HL2.

As described in the section of "New Problems about Wavelength Conversion Device", it has been considered that the power of the harmonic light HL is less likely to depend on the inclination angle of the wavelength convertor 240 if the inclination angle of the wavelength convertor 240 is set in a range of 0 degree to several degrees.

If the wavelength convertor 240 has a periodical polarization reversal structure, an optical path of the fundamental light FL passing through the inclined wavelength convertor 240 is oblique to the polarization reversal structure. Accordingly, a polarization reversal period for the fundamental light FL apparently changes to make the wavelength conversion inefficient.

Unlike a wavelength conversion device including a wavelength convertor arranged so that fundamental light passes through only once, the fundamental light FL passes through the wavelength convertor 240 several times since the wavelength convertor 240 is inserted into the resonator. Accordingly, even under reduced wavelength conversion efficiency, a power level of the harmonic light HL is less likely to change.

The power of the harmonic light of the wavelength conversion device including the wavelength convertor arranged so that fundamental light passes through only once decreases in proportion to the fall of the wavelength conversion efficiency. Since the wavelength convertor 240 is inserted into the resonator, the fall in the wavelength conversion efficiency means a decrease in loss of the fundamental light FL in the resonator.

In short, the power of the fundamental light FL in the resonator is increased. The increase in the power of the fundamental light FL means an increase in the power of the harmonic light HL. Therefore, with the wavelength convertor 240 inserted into the resonator, the power of the harmonic light HL is maintained at a high level in comparison with a general wavelength conversion device, even under the reduced wavelength conversion efficiency of the wavelength convertor 240.

As described above, the wavelength conversion for the fundamental light FL means an increase in loss of the fundamental light FL. Likewise, the fall in the wavelength conversion efficiency of the wavelength convertor 240 inserted into the resonator means a decrease in loss of the fundamental light FL in the resonator.

The inventors deeply studied a relationship between an inclination angle of the wavelength convertor 240 and the power of the harmonic and fundamental lights HL, FL. As a result of the studies, the inventors have figured out new facts about the relationship between an inclination angle of the wavelength convertor 240 and the power of the harmonic and fundamental lights HL, FL. Under the conventional idea, there is a wide range of the inclination angle $\alpha$ of the wavelength convertor 240 for obtaining the harmonic light HL at a high power level. However, according to the new knowledge of the inventors, setting for obtaining the harmonic light HL at a high power level depends on not only the fall in the wavelength conversion efficiency but also the angle $\alpha$ of the inclination between the optical axis OA of the resonator and the wavelength convertor 240.

The wavelength convertor 240 is inserted into the resonator. In this case, if loss of the resonator for the fundamental light FL is reduced, the power of the fundamental light FL increases. Unless the fundamental light FL is reflected and/or diffused on the first end surface 241 of the wavelength convertor 240, the loss is reduced. A reduction in absorption of the fundamental light FL in the wavelength convertor 240 also results in increased power of the fundamental light FL. The inventors have figured out that resultant loss from reflected light is reduced if the reflected light on the first end surface 241 of the wavelength convertor 240 is aligned with the optical axis OA of the resonator.

Figure 4:
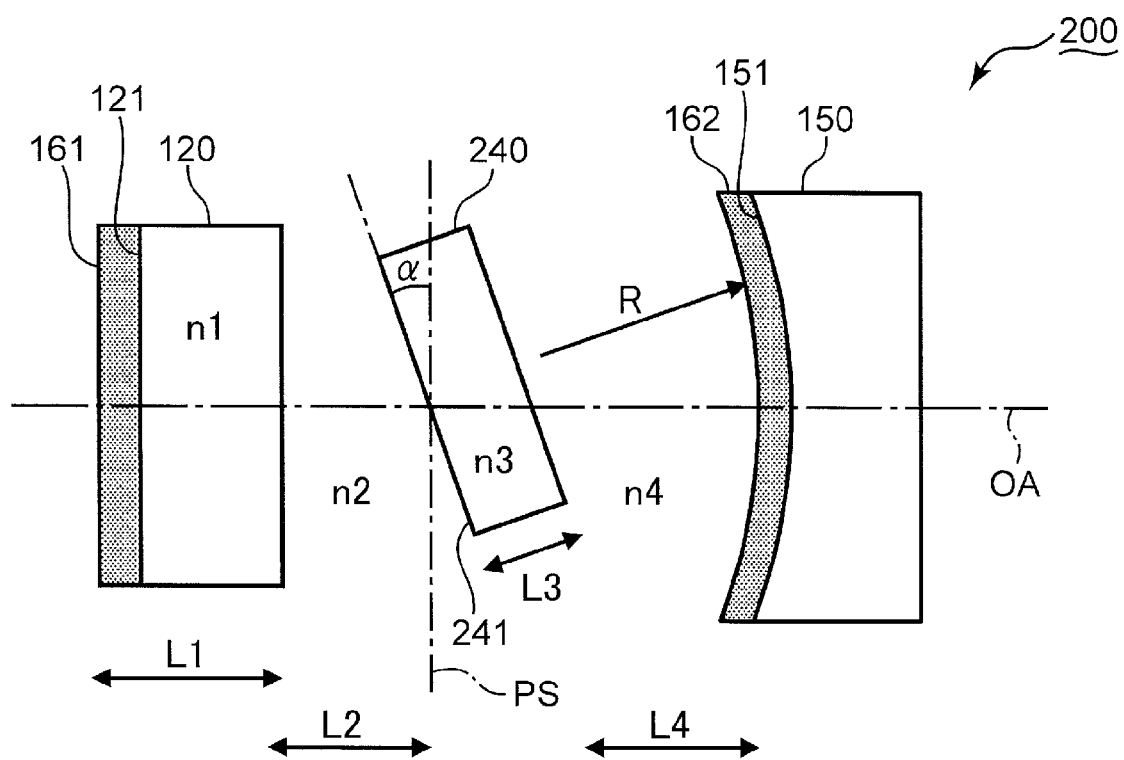
FIG. 4 is a schematic view of a resonator structure of a testing device used by the inventors.

FIG. 4 is a schematic view of a resonator structure of a testing device 200 used for obtaining the aforementioned knowledge. The testing device 200 has the same structure as the wavelength conversion device 100 described with reference to FIG. 2. The wavelength convertor 240 described with reference to FIG. 3 is incorporated in the testing device 200. In FIG. 4, components equivalent to the components of the wavelength conversion device 100 described with reference to FIG. 2 are denoted by the same reference numerals and symbols.

The testing device 200 includes the laser medium 120 and the concave mirror 150. The testing device 200 further includes the wavelength convertor 240 inserted between the laser medium 120 and the concave mirror 150.

The testing device 200 further includes the reflection film 161 covering the incident end surface 121 of the laser medium 120 and the reflection film 162 covering the concave surface 151 of the concave mirror 150. The reflection films 161, 162 for fundamental light function as a resonator.

FIG. 4 shows the optical axis OA of the resonator and the surface PS orthogonal to the optical axis OA. The surface PS passes the intersection between the optical axis OA and the first end surface 241 of the wavelength convertor 240. The first end surface 241 is inclined by the angle $\alpha$ from the surface PS.

The inventors changed the angle α to study a relationship between the power of harmonic light and the angle α. According to the conventional idea described in the section of "New Problems about Wavelength Conversion Device", it is expected that a change in the angle α is less influential to the power of the harmonic light.

Figure 5A:
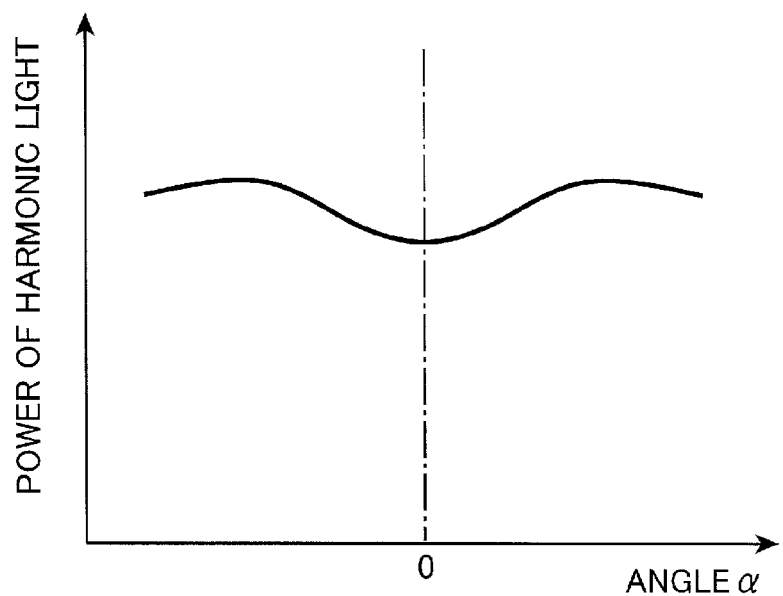
FIG. 5A is a schematic graph representing an expected relationship between an inclination angle and power of harmonic light.
Figure 5B:
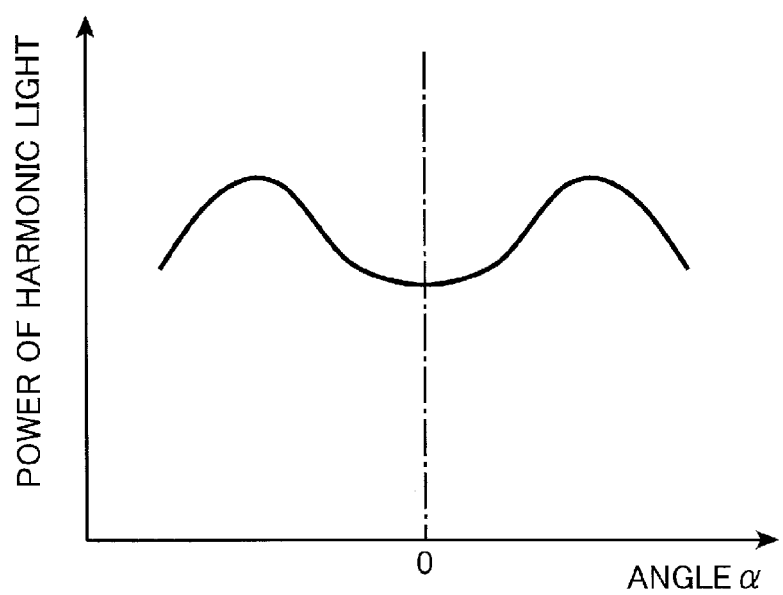
FIG. 5B is a schematic graph representing an actual relationship between the inclination angle and the power of the harmonic light.

FIG. 5A is a schematic graph representing an expected relationship on the basis of the conventional idea between the angle α and the power of the harmonic light. FIG. 5B is a schematic graph representing a relationship obtained from actual measurement between the angle α and the power of the harmonic light. Knowledge of the inventors is described with reference to FIGS. 4 to 5B.

In comparison between FIGS. 5A and 5B, it is figured out that the change in the angle α reduces the power of the harmonic light more than expected. It should be noted that the power of the harmonic light decreases as the angle α gets closer to "0 degree" in the graphs of FIGS. 5A and 5B. This means that interference between inversely converted light and fundamental light generated by the laser medium 120 reduces the power of the harmonic light.

The inventors further studied causes of a difference between power characteristics in FIGS. 5A and 5B. As a result of the additional experiment, the inventors have figured out that the wavelength of the fundamental light changes in response to a change in the angle α.

Figure 6:
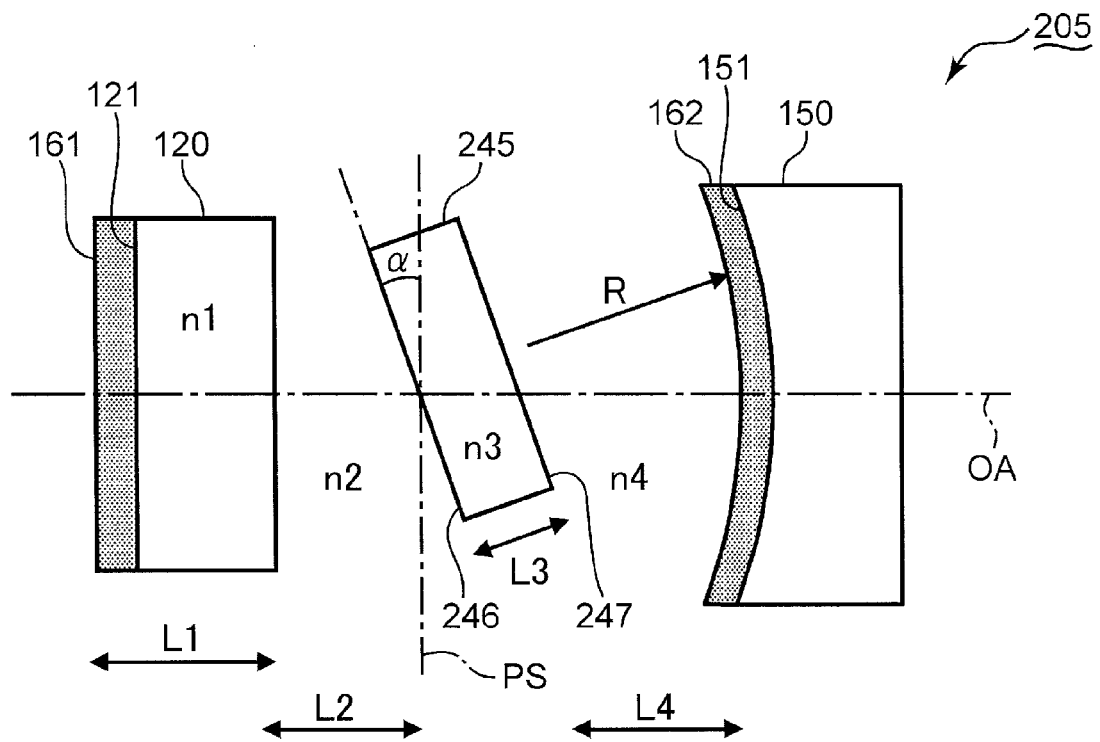
FIG. 6 is a schematic view of the testing device used by the inventors.

FIG. 6 is a schematic view of a testing device 205. The additional experiment is described with reference to FIGS. 4 and 6.

The testing device 205 includes a dummy element 245 without a polarization reversal structure, instead of the wavelength convertor 240 with the polarization reversal structure. The dummy element 245 is situated between the laser medium 120 and the concave mirror 150. The structure, dimension, shape and compositions of the dummy element 245 are the same as those of the wavelength convertor 240 except the polarization reversal structure.

The dummy element 245 includes a first end surface 246, which faces the laser medium 120, and a second end surface 247, which faces the concave mirror 150. The second end surface 247 is parallel to the first end surface 246. It should be noted that the wavelength conversion processes are not performed since the dummy element 245 does not have the polarization reversal structure.

The inventors used the testing device 205 to change the inclination angle α of the first end surface 246 from the surface PS and study a relationship between a change in loss of fundamental light and a wavelength.

Figure 7:
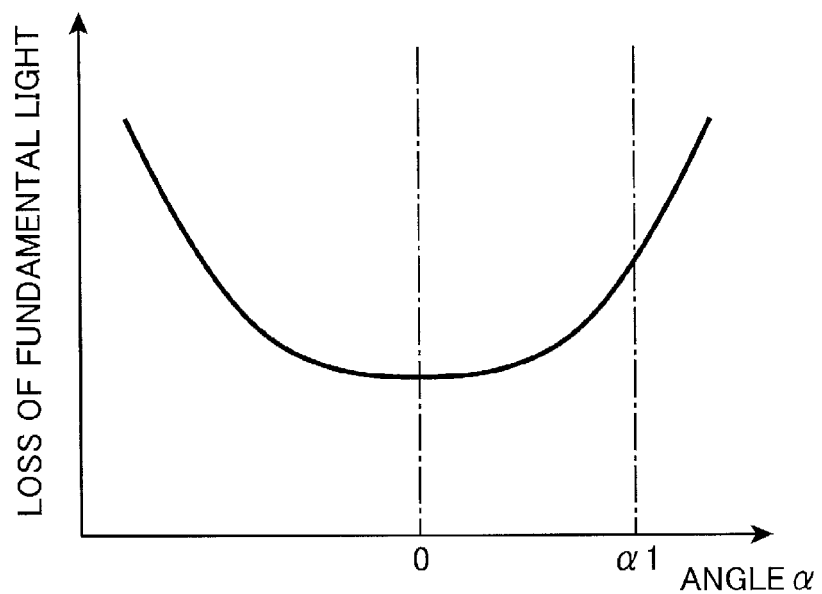
FIG. 7 is a schematic graph representing a change in loss of fundamental light in response to a change in the inclination angle.

FIG. 7 is a schematic graph representing a change in loss of fundamental light in response to a change in the angle α. The change in the loss of the fundamental light in response to the change in the angle α is described with reference to FIG. 7.

It is figured out from the graph of FIG. 7 that the loss of the fundamental light increases as the angle α changes apart from "0 degree".

Figure 8A:
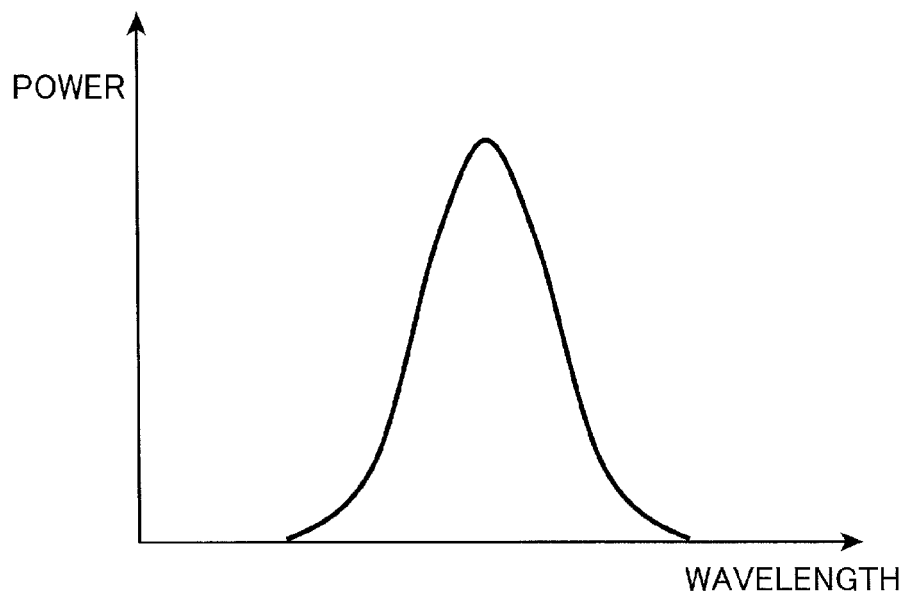
FIG. 8A is a schematic graph representing a wavelength distribution of the fundamental light when the inclination angle is 0 degree.
Figure 8B:
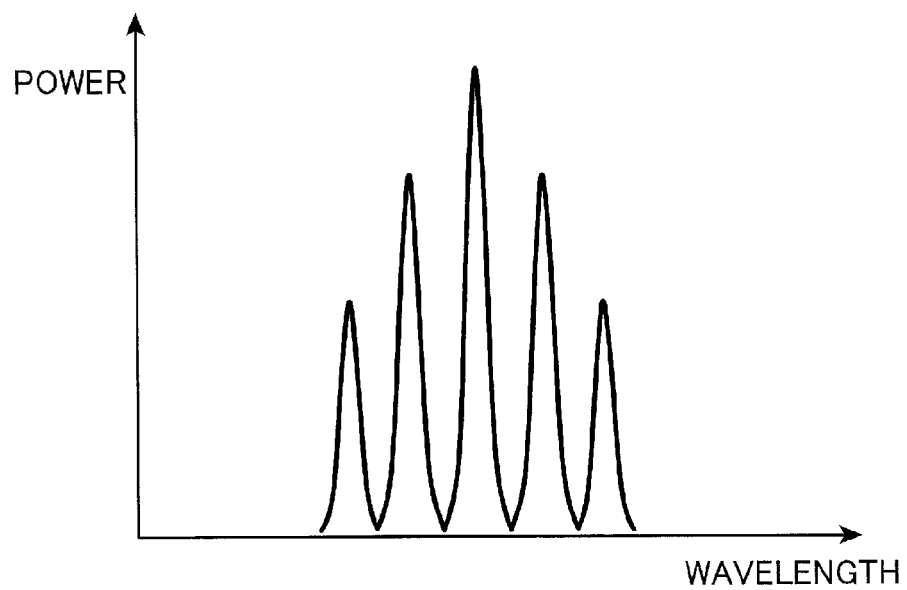
FIG. 8B is a schematic graph representing a wavelength distribution of the fundamental light when the inclination angle is larger than 0 degree.

FIG. 8A is a schematic graph representing a wavelength distribution of the fundamental light when the angle α is "0 degree". FIG. 8B is a schematic graph representing a wavelength distribution of the fundamental light when the angle α is "α1" larger than "0 degree" (c.f. FIG. 7). The wavelength distributions of the fundamental light are described with reference to FIGS. 6 to 8B.

The wavelength distributions of the fundamental light depend on oscillation characteristics of the laser medium 120. For example, the laser medium 120 formed from Nd:YVO$_4$ generates fundamental light in a wavelength band of 1064 nm.

As described with reference to FIG. 7, if the angle α is close to 0 degree, the loss of the fundamental light becomes small. At this point, there is one power peak over the wavelength of the fundamental light.

As shown in FIG. 7, the loss of the fundamental light increases as the angle α changes apart from "0 degree". When the angle α is sufficiently larger than "0 degree" (i.e., α=α1), several power peaks over the wavelength of the fundamental light appear. This means that the loss of the fundamental light periodically fluctuates in response to an increase or decrease in the wavelength.

The inventors calculated a period of the power fluctuation. The inventors confirmed that the period of the power fluctuation coincides with a period of the etalon effect appearing in light passing through a pair of parallel surfaces.

According to the inventors, if an element with a pair of parallel surfaces is inserted into a resonator, the etalon effect appears. As a result of the etalon effect, reflectance for a light wavelength having a specific period decreases to zero. Therefore, transmission loss for the light wavelength having the specific period is small.

If light has a wavelength which does not achieve zero reflectance, the light is reflected on the pair of parallel surfaces. If the angle α is close to zero, the light of the wavelength reflected on the pair of parallel surfaces returns to the laser medium 120. The light returned to the laser medium 120 is reused as the fundamental light. If the angle α is increased, the light reflected on the pair of parallel surfaces does not return to the laser medium 120. Accordingly, the light reflected on the pair of parallel surfaces is lost.

Figure 9:
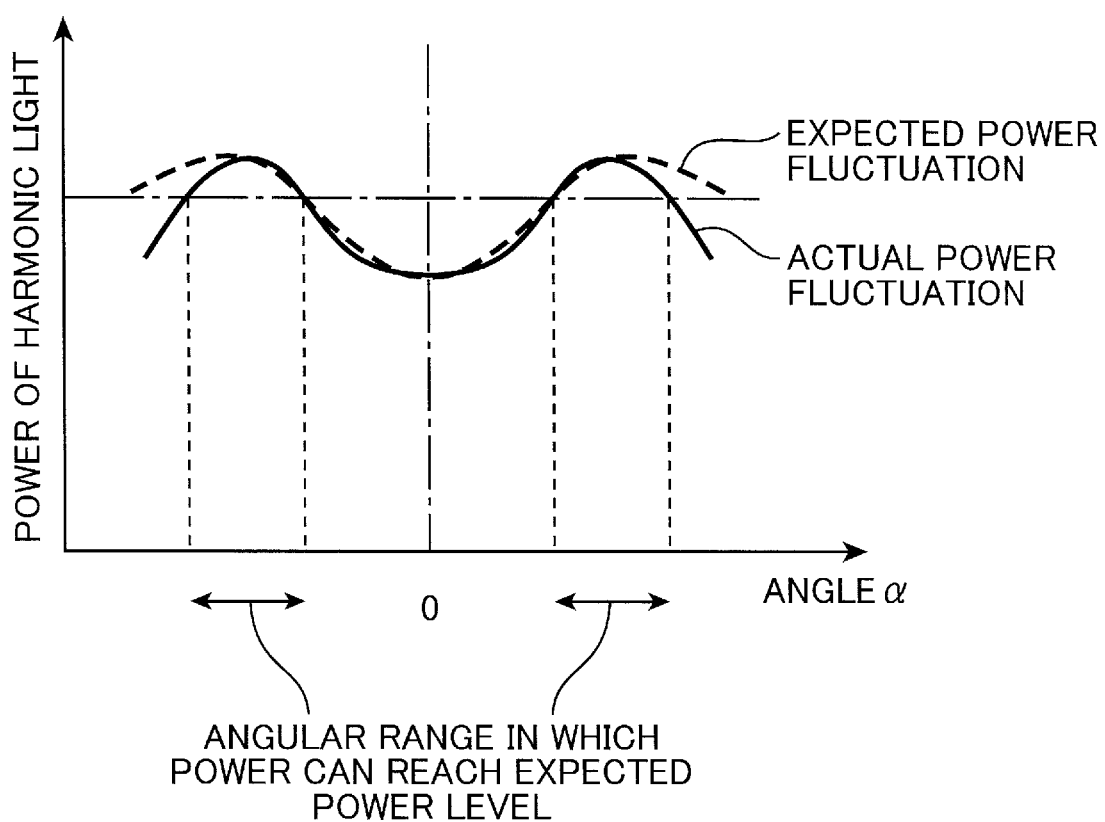
FIG. 9 is a schematic graph representing a power fluctuation of the harmonic light in response to a change in the inclination angle.

FIG. 9 is a schematic graph representing a power fluctuation of the harmonic light in response to a change in the angle α of the wavelength convertor 240. In the graph of FIG. 9, the power fluctuation expected on the basis of the background art described in the section of "New Problems about Wavelength Conversion Device" is represented by the dotted line. The power fluctuation measured in the experiment is represented by the solid line. The power fluctuation of the harmonic light in response to the change in the angle α of the wavelength convertor 240 is described with reference to FIGS. 2, 4 and 9.

As shown in FIG. 9, actual power of the harmonic light changes more largely in response to a change in the angle α than expected. Therefore, a range of the angle α which allows the power of the harmonic light to achieve the expected power level is limited to a narrow range.

The angle θ described with reference to FIG. 2 is set within the range of the angle α which allows the power of the harmonic light to achieve the expected power level shown in FIG. 9.

The inventors studied the range of the angle α which allows the power of harmonic light to achieve the expected power level. As a result of the study, the inventors have figured out that the inversely converted light is less likely to cause a power drop if the angle θ is set within the range indicated by the following formulas. Under appropriate setting of the angle θ, the wavelength conversion device 100 may reduce loss of the fundamental light FL to emit high power harmonic light HL.

The following range of the angle θ defined by Formulas 1 to 5 is a condition for an appropriate angular range found by the inventors. Various parameters indicated by the following formulas are shown in FIG. 4.

$$\text{Spreading Angle of Harmonic Light} < \theta < \theta 1 = \frac{1}{2}\tan^{-1}\left(\frac{\frac{\phi 1 + \phi 2}{2}}{L_1}\right) \quad \text{[Formula 1]}$$

where, $L_1$: length of the laser medium in an optical axis direction.

$\phi 1$ and $\phi 2$ are defined by Formula 2.

$$\phi 1 = 2\sqrt{\left(\frac{\lambda}{2\pi}\right)\sqrt{4L(R-L)}} \quad \text{[Formula 2]}$$

$$\phi 2 = \phi 1 \sqrt{1 + \frac{(2L_1)^2}{\left(\frac{\pi n_0 \phi 1^2}{4\lambda}\right)^2}}$$

where,
$\lambda$: wavelength of the fundamental light;
$L$: resonator length;
$\pi$: circular constant; and
$R$: curvature radius of the resonator mirror.

$n_0$ is defined by Formula 3.

$$n_0 = \frac{n'}{L'} \quad \text{[Formula 3]}$$

It should be noted that n' is defined by Formula 4 whereas L' is defined by Formula 5.

$$n' = n_1 L_1 + n_2(L_2 - L_1) + \frac{L_2 - L_1}{\cos 2\theta} + \frac{L_1}{\cos\left\{\sin^{-1}\left(\frac{n_1}{n_2}\sin 2\theta\right)\right\}} \quad \text{[Formula 4]}$$

where,
$n_1$: refractive index of the laser medium;
$n_2$: refractive index between the laser medium and the wavelength convertor; and
$L_2$: distance from the laser medium to the wavelength convertor.

$$L' = L_2 + \frac{L_2 - L_1}{\cos 2\theta} + \frac{L_1}{\cos\left\{\sin^{-1}\left(\frac{n_1}{n_2}\sin 2\theta\right)\right\}} \quad \text{[Formula 5]}$$

Formulas 1 to 5 are simplified formulas in which fewer parameters are used. More specifically, the range of the angle $\theta$ may be defined by Formulas 6 to 10 shown below. Various parameters in the following formulas are shown in FIG. 4.

$$\text{Spreading Angle of Harmonic Light} < \theta < \theta 1 = \frac{1}{2}\tan^{-1}\left(\frac{\frac{\phi 1 + \phi 2}{2}}{n_1 L_1 + n_2 L_2}\right) \quad \text{[Formula 6]}$$

where,
$L_1$: length of the laser medium in the optical axis direction;
$L_2$: distance from the laser medium to the wavelength convertor;
$n_1$: refractive index of the laser medium; and
$n_2$: refractive index between the laser medium and the wavelength convertor.

$\phi 1$ and $\phi 2$ are defined by Formula 7.

$$\phi 1 = 2\sqrt{\left(\frac{\lambda}{2\pi}\right)\sqrt{4L_a(R-L_a)}} \quad \text{[Formula 7]}$$

$$\phi 2 = \phi 1 \sqrt{1 + \frac{\{2(n_1 L_1 + n_2 L_2)\}^2}{\left(\frac{\pi n_0 \phi 1^2}{4\lambda}\right)^2}}$$

where,
$\lambda$: wavelength of the fundamental light;
$\pi$: circular constant; and
$R$: curvature radius of the resonator mirror.

$L_a$ and $n_0$ are defined by Formula 8.

$$L_a = n_1 L_1 + n_2 L_2 + n_3 L_3 + n_4 L_4 \quad \text{[Formula 8]}$$

$$n_0 = \frac{n'}{L'}$$

where,
$L_3$: length of the wavelength convertor in the optical axis direction;
$L_4$: distance from the wavelength convertor to the resonator mirror;
$n_3$: refractive index of the wavelength convertor; and
$n_4$: refractive index between the wavelength convertor and the resonator mirror.

n'0 is defined by Formula 9 whereas L' is defined by Formula 10.

$$n' = n_1 L_1 + n_2 L_2 + \frac{n_3 L_2}{\cos 2\theta} + \frac{n_4 L_1}{\cos\left\{\sin^{-1}\left(\frac{n_1}{n_2}\sin 2\theta\right)\right\}} \quad \text{[Formula 9]}$$

$$L' = L_1 + L_2 + \frac{L_2}{\cos 2\theta} + \frac{L_1}{\cos\left\{\sin^{-1}\left(\frac{n_1}{n_2}\sin 2\theta\right)\right\}} \quad \text{[Formula 10]}$$

It should be noted that a numerical difference between the range of the angle $\theta$ calculated by Formulas 1 to 5 and the range of the angle $\theta$ calculated by Formulas 6 to 10 is substantially negligible. Therefore, the wavelength convertor 140 may be inclined in a range of the angle $\theta$ calculated by Formulas 1 to 5 or the wavelength convertor 140 may be inclined in the range of the angle $\theta$ calculated by Formulas 6 to 10.

Figure 10:
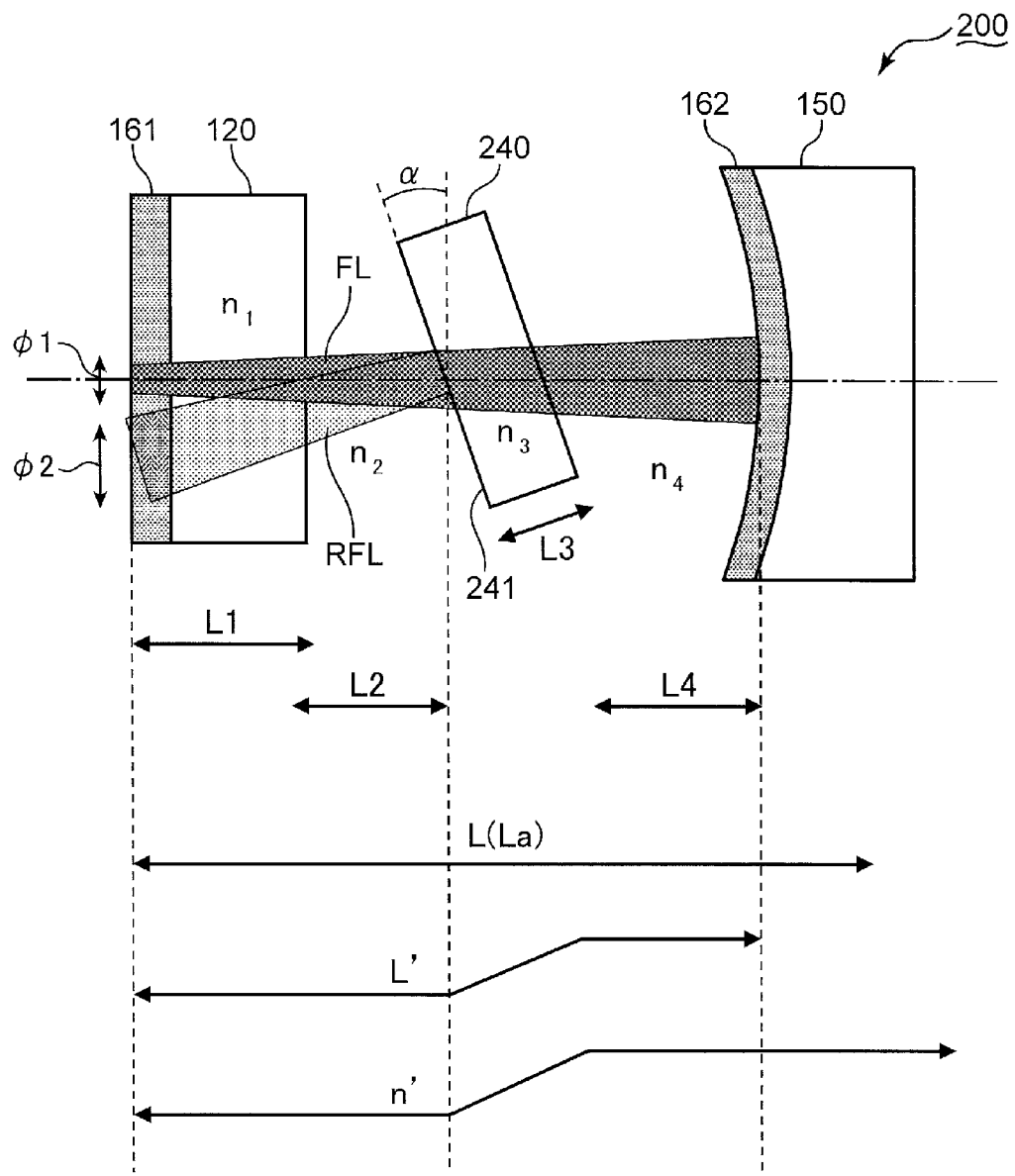
FIG. 10 is a schematic view of the testing device shown in FIG. 4.

FIG. 10 is a schematic view of the testing device 200. Physical meanings of the aforementioned formulas are described with reference to FIGS. 2 to 10.

In Formulas 1 and 6, the angle $\theta$ is set larger than "Spreading Angle of Harmonic Light HL". It should be noted that the spreading angle of the harmonic light HL is defined as a value of a half of full width at half maximum (FWHM).

If the angle $\theta$ is no more than "Spreading Angle of Harmonic Light HL", an optical path of the second harmonic light HL2 overlaps an optical path of the first harmonic light HL1. Therefore, the power of the harmonic light HL emitted from the wavelength conversion device 100 is reduced by interference between the first and second harmonic lights HL1, HL2. According to Formulas 1 and 2, the angle θ does not make the optical path of the second harmonic light HL2 overlap the optical path of the first harmonic light HL1. Therefore, the wavelength conversion device 100 may emit high power harmonic light HL.

In Formulas 1 and 6, the parameter "φ1" is used. The parameter "φ1" used in Formula 1 is defined by Formula 2. The parameter "φ1" used in Formula 6 is defined by Formula 7.

The laser medium 120 and the reflection films 161, 162 collaborate each other to generate the fundamental light FL. The parameter "φ1" means a diameter of the fundamental light FL on the surface of the reflection film 161 which covers the incident end surface 121.

In Formulas 1 and 6, the parameter "φ2" is used. The parameter "φ2" used in Formula 1 is defined by Formula 2. The parameter "φ2" used in Formula 6 is defined by Formula 7.

A part of the fundamental light FL is reflected by the first end surface 241 (or the first end surface 141) of the wavelength convertor 240 (or the wavelength convertor 140), and then returns to the laser medium 120. In FIG. 10, the part of the fundamental light reflected by the first end surface 241 (or the first end surface 141) of the wavelength convertor 240 (or the wavelength convertor 140) is represented by the symbol "RFL". The parameter "φ1" means a diameter of the fundamental light RFL on the surface of the reflection film 161 which covers the incident end surface 121.

If the inclination angle α of the wavelength convertor 240 is larger than the parameter "θ1" calculated by the right term of Formulas 1 and 6, a cross section of the fundamental light RFL does not overlap a cross section of the fundamental light FL on the surface of the reflection film 161 which covers the incident end surface 121, as shown in FIG. 10. Unless the cross section of the fundamental light RFL overlaps the cross section of the fundamental light FL, energy of the fundamental light RFL is not reused as the fundamental light FL traveling back and forth in the resonator. Accordingly, the energy of the fundamental light RFL results in power loss of the fundamental light FL.

In this embodiment, the inclination angle θ of the wavelength convertor 140 is set smaller than the parameter "θ1". Therefore, the cross section of the fundamental light RFL overlaps the cross section of the fundamental light FL on the surface of the reflection film 161 which covers the incident end surface 121. If the cross section of the fundamental light RFL overlaps the cross section of the fundamental light FL, the energy of the fundamental light RFL is transferred to the fundamental light FL on the surface of the reflection film 161. Accordingly, the energy of the fundamental light RFL is effectively reused as the fundamental light FL. Therefore, there is little loss of the fundamental light FL in the resonator.

In Formula 7, the parameter "$L_a$" is used. The parameter "$L_a$" is defined by Formula 8. The parameter "$L_a$" means a resonator length which takes account of a spatial distance and a refractive index.

The parameter "$n_0$" is used for calculation of the parameter "φ2" in Formulas 2 and 7. The parameter "$n_0$" is defined by Formulas 3 and 8. The parameter "$n_0$" represents an average of apparent refractive indexes of spaces between the laser medium 120 and the reflection films 161, 162.

The parameter "L'" is used for calculation of the parameter "$n_0$" in Formulas 3 and 8. The parameter "n'" is defined by Formulas 4 and 9. The parameter "L'" means a resonator length which takes account of a spatial distance, a refractive index and the inclination of the wavelength convertor 140.

The parameter "n'" is used for calculation of the parameter "$n_o$" in Formulas 3 and 8. The parameter "n'" is defined by Formulas 5 and 10. The parameter "L'" means a resonator length which takes account of a spatial distance and the inclination of the wavelength convertor 140.

FIG. 11 is a graph representing a relationship between the power of the harmonic light HL and the inclination angle α of the wavelength convertor 240. Critical significance of the angle θ defined by Formula 1 or 6 is described with reference to FIGS. 2, 10 and 11.

The first and second harmonic lights HL1, HL2 overlap each other in the angular range RG1 around "0 degree" shown in FIG. 11. The cross section of the fundamental light RFL does not overlap the cross section of the fundamental light FL on the surface of the reflection film 161 covering the incident end surface 121 in the angular ranges RG2, RG3 shown in FIG. 11 (angular ranges in which an absolute value of the inclination angle α exceeds about 1.7 degrees).

The power of the harmonic light HL noticeably decreases in the angular ranges RG1, RG2, RG3. On the other hand, the power of the harmonic light HL maintains substantially constant at a high level in an angular range between the angular ranges RG1, RG2 and an angular range between the angular ranges RG1, RG3. Therefore, the range of the angle θ defined by Formula 1 or 6 has the critical significance.

The spreading angle of the harmonic light HL is desirably no more than 0.2 degrees. If the spreading angle of the harmonic light HL exceeds 0.2 degrees, the first harmonic light HL1 is likely to interfere with the second harmonic light HL2.

The distance between the laser medium 120 and the wavelength convertor 140 (defined as the parameter "$L_2$" in Formulas 4 and 6) is desirably no longer than 1 mm. The wavelength conversion efficiency of the wavelength convertor 140 is substantially proportional to density of the fundamental light FL. If the distance between the laser medium 120 and the wavelength convertor 140 is no longer than 1 mm, the wavelength conversion efficiency of the wavelength convertor 140 is maintained at a high level.

The resonator length (defined as the parameter "L" in Formula 2) in a direction of the optical axis OA is desirably no longer than 10 mm. If the resonator length in the direction of the optical axis OA is no longer than 10 mm, light reflected by the wavelength convertor 140 is likely to return to the laser medium 120.

FIG. 12 is a table representing exemplary numerical values substituted in parameters for the range calculation of the angle θ by means of Formulas 1 to 5. The calculation of the angle θ is described with reference to FIG. 12.

The range of the angle θ calculated by using the numerical values shown in FIG. 12 is larger than 0.2 degrees and smaller than 2.1 degrees.

If Formulas 1 to 5 or Formulas 6 to 10 are used, appropriate inclination angles of the wavelength convertor are calculated for various types of resonators.

The definitions by the aforementioned formulas are applicable to various structures of the wavelength conversion device 100.

A semiconductor laser configured to generate the excitation light PL in an 880 nm band may be used as the laser source 110. Alternatively, another laser device configured to generate excitation light of a wavelength, which the laser medium 120 absorbs, may be used as the laser source 110. Therefore, a laser device used as the laser source 110 may be selected according to a type of the laser medium 120.

The laser medium 120 may be Nd-doped Gadolinium Vanadate (hereinafter referred to as "$GdVO_4$"). In the following description, the Nd-doped $GdVO_4$ is referred to as "Nd:

GdVO$_4$". The thermal conductivity of a laser crystal substance of Nd:GdVO$_4$ is high. Therefore, if the laser crystal substance of Nd:GdVO$_4$ is used as the laser medium 120, a temperature rise of the laser medium 120 is suppressed. Since the laser medium 120 is maintained at a low temperature, the laser medium 120 may efficiently generate the fundamental light FL from the excitation light PL. Consequently, the wavelength conversion device 100 may efficiently emit the harmonic light HL.

The laser medium 120 may be Nd-doped Yttrium Aluminum Garnet (hereinafter referred to as "Yag"). In the following description, the Nd-doped Yag is referred to as "Nd:Yag". Since Nd:Yag is inexpensive, the wavelength conversion device 100 is manufactured at low costs.

The transmission films 172, 173 covering the first and second end surfaces 141, 142 of the wavelength convertor 140 are not essential. However, if the transmission films 172, 173 having transmittance no less than 99.7% are formed on the wavelength convertor 140, there is little reflection on the first and second end surfaces 141, 142. Accordingly, there is little loss of the fundamental light FL in the resonator. Consequently, the wavelength conversion device 100 may emit the harmonic light HL very efficiently.

If the conditions about the angle θ defined by the aforementioned formulas are satisfied, the wavelength convertor 140 may be inclined from the optical axis OA so that the first end surface 141 of the wavelength convertor 140 forms Brewster's angle. Accordingly, a polarization component in a specific direction of the fundamental light FL is less likely to be reflected by the wavelength convertor 140. Therefore, there is little loss in the resonator. Consequently, the wavelength conversion device 100 may emit the harmonic light HL very efficiently.

(Inclining Direction of Wavelength Convertor)

Figure 13:
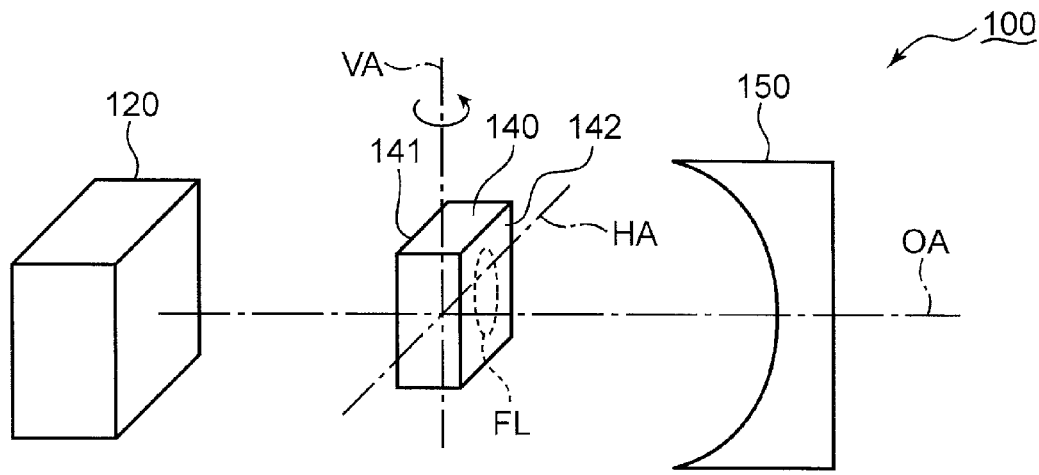
FIG. 13 is a schematic perspective view of a resonator structure of the wavelength conversion device shown in FIG. 2.

FIG. 13 is a schematic perspective view of a resonator structure of the wavelength conversion device 100. An inclining direction of the wavelength convertor 140 is described with reference to FIGS. 2, 11 and 13.

FIG. 13 shows the laser medium 120, the wavelength convertor 140 and the concave mirror 150 as the resonator structure of the wavelength conversion device 100. A beam shape of the fundamental light FL may become a substantially elliptical in the resonator according to characteristics of the wavelength conversion device 100. It should be noted that the term "beam shape" means a sectional shape of a beam. In FIG. 13, an elliptical beam shape of the fundamental light FL is drawn as the dotted line on the second end surface 142 of the wavelength convertor 140.

In addition to the optical axis OA, FIG. 13 shows the axis VA, which is orthogonal to the optical axis OA and coincides with the major axis of the elliptical beam shape of the fundamental light FL, and the axis HA orthogonal to the optical axis OA and the axis VA.

After the wavelength convertor 140 is set so that the first end surface 141 of the wavelength convertor 140 coincides with the surface PS described with reference to FIG. 2, the wavelength convertor 140 may be rotated around the axis VA. As a result of the rotation of the wavelength convertor 140 around the axis VA, the angle θ is set within the range defined by the aforementioned formulas.

As described above, if the optical paths of the first and second harmonic lights HL1, HL2 overlap, the power of the harmonic light HL emitted from the wavelength conversion device 100 is reduced by resultant interference from inverse conversion. Under a condition that a beam shape of the fundamental beam FL traveling back and forth in the resonator is elliptical, if the wavelength convertor 140 is rotated around the axis VA, the interference between the first and second harmonic lights HL1, HL2 is prevented by a small rotation amount of the wavelength convertor 140. This means a reduction in the angular range RG1 described with reference to FIG. 11. Therefore, angular setting for the wavelength convertor 140 is facilitated.

Figure 14:
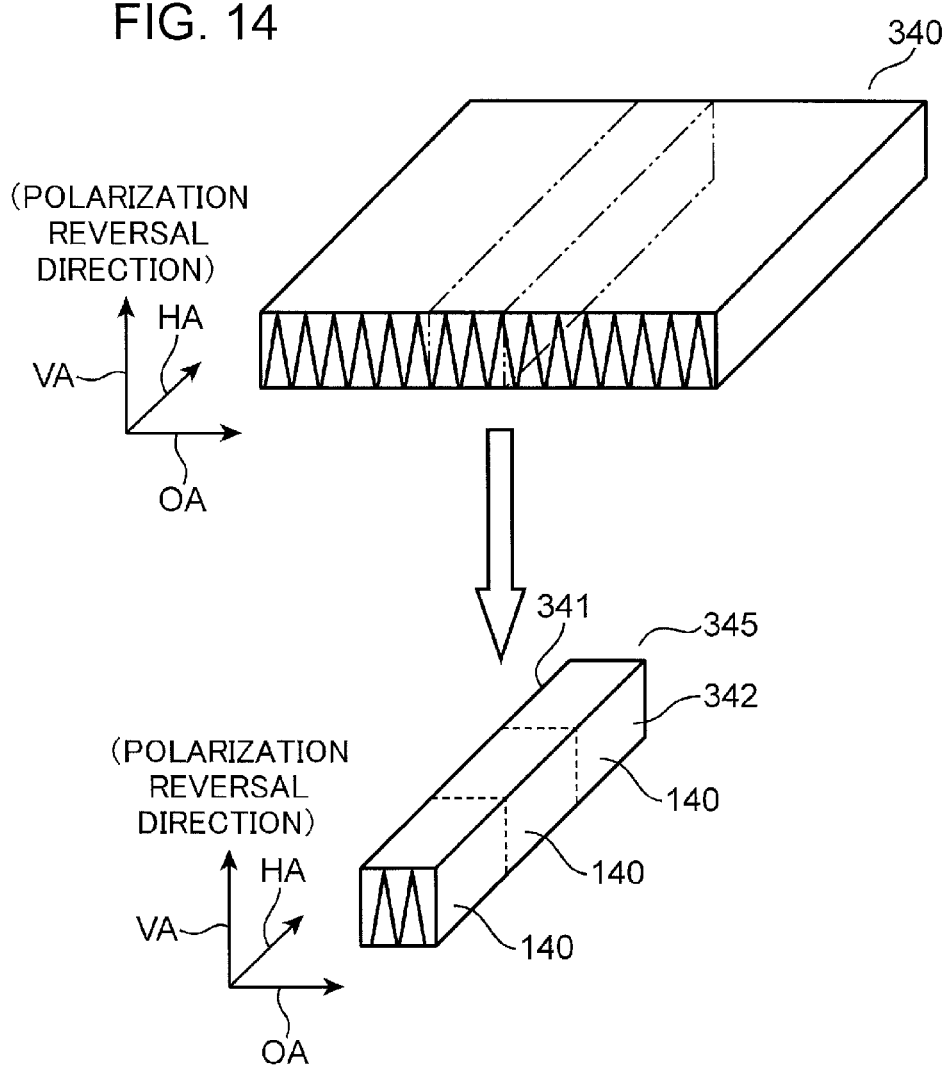
FIG. 14 is a schematic view of manufacturing processes for a wavelength convertor of the wavelength conversion device shown in FIG. 13.

FIG. 14 is a schematic view of manufacturing processes for the wavelength convertor 140. The manufacturing processes for the wavelength convertor 140 are described with reference to FIGS. 2 and 14.

FIG. 14 shows a coordinate represented by the optical axis OA, the axis VA and the axis HA. The wavelength convertor 140 has a polarization-reversed region for performing wavelength conversion. Therefore, in this embodiment, a crystal plate 340 made of a crystal body used as the wavelength convertor 140 is prepared. A polarization reversal structure is formed on the crystal plate 340. It should be noted that the polarization reversal structure may be formed on the basis of known formation techniques. The axis VA is set along a polarization reversal direction.

After the formation of the polarization reversal structure, the crystal plate 340 is cut along the axis HA. Accordingly, several crystal rods 345 are sliced from the crystal plate 340.

Paired surfaces 341, 342 of the crystal rod 345 substantially orthogonal to the optical axis OA are polished. A dimension in the direction of the optical axis OA after the polishing is equivalent to the parameter "$L_3$" used in Formula 8.

After the polishing, the crystal rod 345 is cut in the direction of the optical axis OA. Accordingly, the crystal rod 345 is divided into several wavelength convertors 140.

The thickness (in the direction of the axis VA) of the crystal plate 340 is limited to a dimension for enabling the formation of the polarization reversal structure. On the other hand, a dimension of the crystal rod 345 in the direction of the axis HA may be set larger than a dimension in the direction of the axis VA. Therefore, polishing errors are likely to happen to the direction of the axis VA. Therefore, the wavelength conversion efficiency by the wavelength convertor 140 is likely to change in response to a position of the fundamental light FL in the direction of the axis VA.

Figure 15:
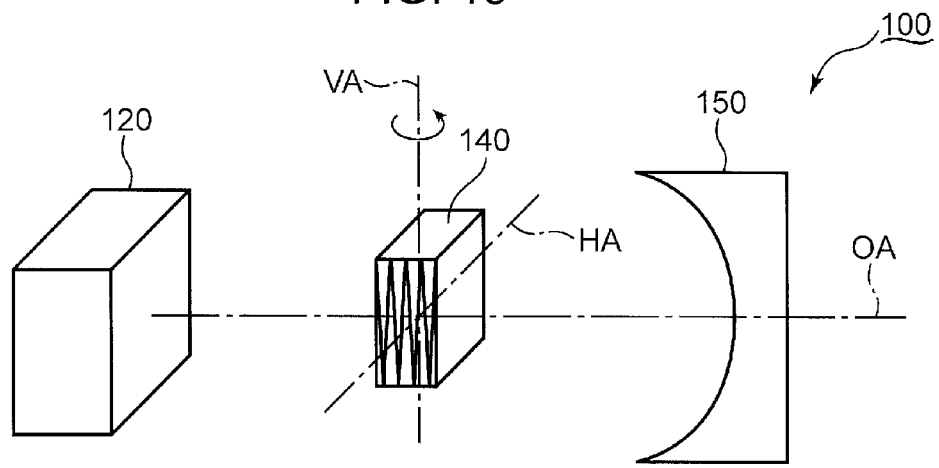
FIG. 15 is a schematic perspective view of the resonator structure of the wavelength conversion device shown in FIG. 2.

FIG. 15 is a schematic perspective view of the resonator structure of the wavelength conversion device 100. The inclining direction of the wavelength convertor 140 is described with reference to FIGS. 2 and 15.

FIG. 15 shows the laser medium 120, the wavelength convertor 140 and the concave mirror 150 as a resonator structure of the wavelength conversion device 100. The wavelength convertor 140 is inserted along the axis VA between the laser medium 120 and the concave mirror 150. The position of the wavelength convertor 140 in the direction of the axis VA is desirably set to maximize the wavelength conversion efficiency by the wavelength convertor 140.

The wavelength convertor 140 is rotated around the axis VA to set the angle θ in the range specified by the aforementioned formulas. During adjustment to the angle θ, the wavelength convertor 140 does not displace along the direction of the axis VA. Therefore, the wavelength convertor 140 maintains appropriate wavelength conversion efficiency.

(Holding Structure for Wavelength Convertor)

Figure 16:
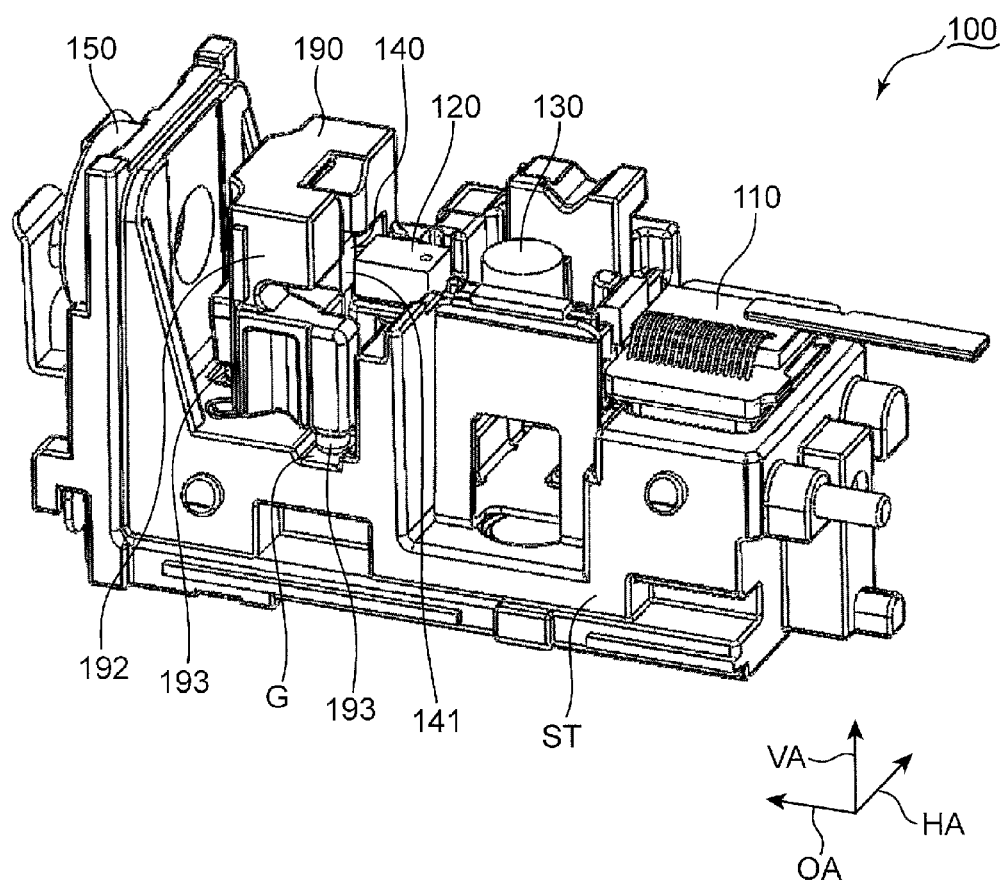
FIG. 16 is a schematic perspective view of the wavelength conversion device shown in FIG. 2.

FIG. 16 is a schematic perspective view of the wavelength conversion device 100. The wavelength conversion device 100 is described with reference to FIGS. 2, 15 and 16.

The wavelength conversion device 100 shown in FIG. 16 is installed on a pedestal section ST. FIG. 16 shows the laser source 110, the condensing lens 130, the laser medium 120, the wavelength convertor 140 and the concave mirror 150.

FIG. 16 shows a coordinate defined by the optical axis OA, the axis HA and the axis VA. As described with reference to FIG. 15, the polarization reversal direction of the wavelength convertor 140 coincides with the direction of the axis VA. If a beam shape of the fundamental light FL traveling back and forth between the laser medium 120 and the concave mirror 150 is elliptical, the setting of the laser source 110, the condensing lens 130, the laser medium 120 and the concave mirror 150 may be adjusted to align the major axis of the cross section of the fundamental light FL with the axis VA. In addition, the setting of the laser source 110, the condensing lens 130, the laser medium 120 and the concave mirror 150 may be adjusted to make the polarization direction of the fundamental light FL substantially coincident with the axis HA.

The wavelength conversion device 100 further includes a holder 190 configured to hold the wavelength convertor 140. The wavelength convertor 140 is accurately positioned by the holder 190.

Figure 17:
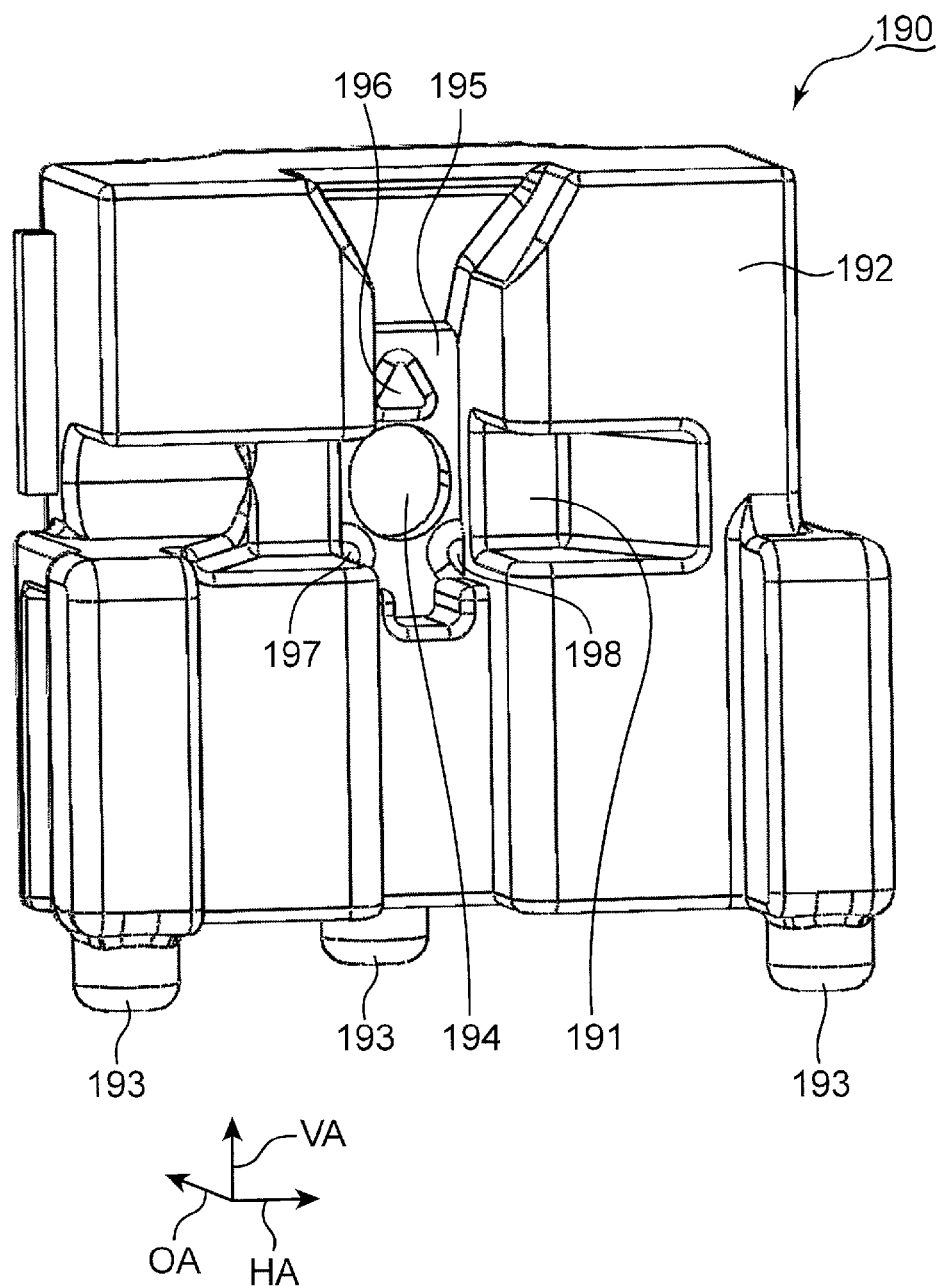
FIG. 17 is a schematic perspective view of a holder of the wavelength conversion device shown in FIG. 16.
Figure 18:
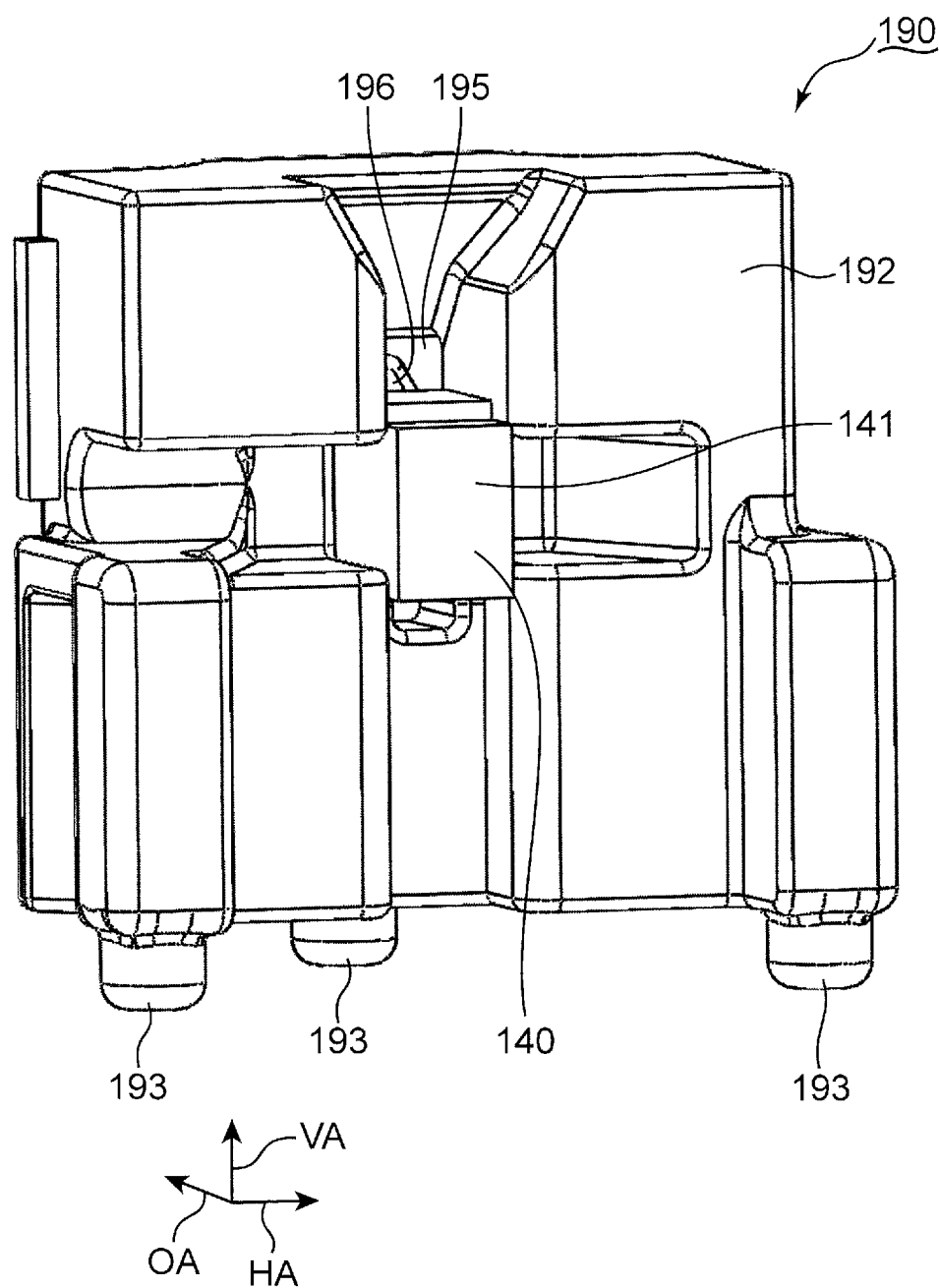
FIG. 18 is a schematic perspective view of the holder shown in FIG. 17.

FIG. 17 is a schematic perspective view of the holder 190. FIG. 18 is a schematic perspective view of the holder 190 holding the wavelength convertor 140. The holder 190 is described with reference to FIGS. 14, 16 to 18.

The holder 190 includes a holding body 192, in which a recess 191 for storing the wavelength convertor 140 is formed, and three legs 193 projecting downward from the holding body 192.

Grooves G are formed in the pedestal section ST to receive the legs 193. The grooves G are formed slightly larger than the legs 193. Therefore, the holder 190 may slightly rotate around the axis VA. The holder 190 is rotated around the axis VA by a rotary mechanism (not shown in the figure) adjacent to the wavelength conversion device 100. On the other hand, the rotating mechanism prevents displacement of the holder 190 in the directions of the optical axis OA and the axis HA. Therefore, only slight rotation around the axis VA is allowed for the wavelength convertor 140 on the pedestal section ST. The wavelength convertor 140 is rotated around the axis VA to set up the angle θ.

The wavelength convertor 140 is about 1.5 mm in height (the direction of the axis VA). The wavelength convertor 140 is about 1 mm in width (the direction of the axis HA). The wavelength convertor 140 is about 1.5 mm in thickness (the direction of the optical axis OA). As described with reference to FIG. 14, since the first and second end surfaces 141, 142 of the wavelength convertor 140 are polished, the first and second end surfaces 141, 142 have high accuracy.

An area which is about 1 mm in diameter is required to generate the harmonic light HL. The aforementioned dimension of the wavelength convertor 140 is large enough to generate the harmonic light HL. Since the wavelength convertor 140 is not excessively large, the costs for the wavelength convertor 140 are reduced.

As shown in FIG. 17, the holder 190 further includes an upright wall 195, in which a light transmitting hole 194 is formed, and bosses 196, 197, 198, which abut with the second end surface 142 of the wavelength convertor 140. The bosses 196, 197, 198 protrude from the upright wall 195 toward the wavelength convertor 140. The boss 196 is situated above the other bosses 197, 198. The bosses 197, 198 are aligned in the direction of the axis HA.

The second end surface 142 of the wavelength convertor 140 is pressed against the bosses 196, 197, 198. Since the polished second end surface 142 is pressed against the bosses 196, 197, 198, angular setting for the wavelength convertor 140 becomes very accurate.

The range of the angle θ defined by the aforementioned formulas is very narrow. Therefore, if various error factors such as parallelism of the wavelength convertor 140, attachment accuracy of the laser medium 120, dimensional accuracy of the pedestal section ST, and perpendicularity of the holder 190 are taken into account, errors in the height (the direction of the optical axis OA) for the bosses 196, 197, 198 is in a range of an error no less than 3 μm and no more than 5 μm. The aforementioned acceptable errors are very small, in comparison to the fact that acceptable errors in height for the bosses 196, 197, 198 is no less than 20 μm and no more than 50 μm under the conventional idea described in the section of "New Problems about Wavelength Convertor". Therefore, it is also figured out that the aforementioned range of the angle θ is limited to a very narrow range in comparison to the angular range expected under the conventional idea.

(Second Embodiment)

Figure 19:
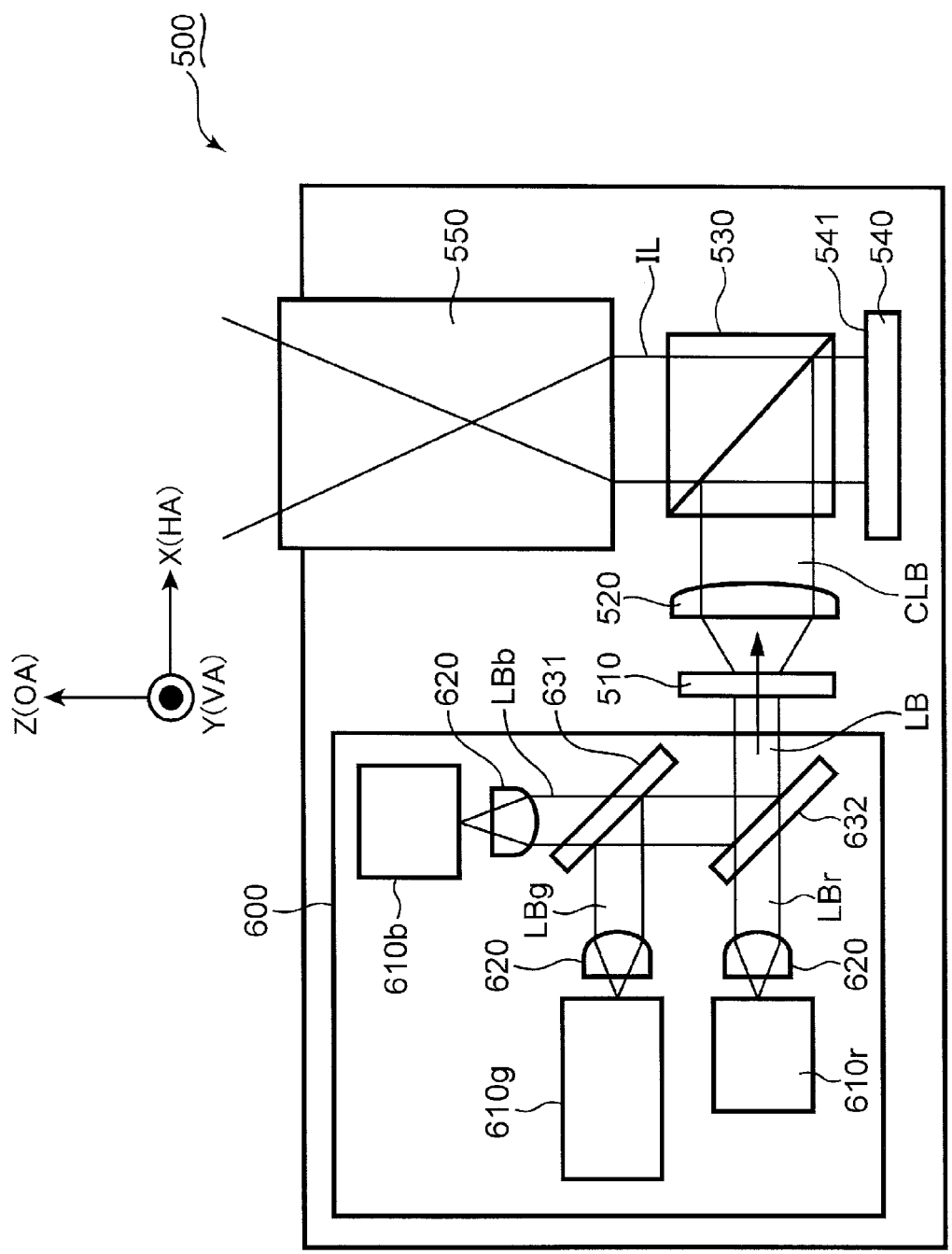
FIG. 19 is a schematic view of an image display device according to the second embodiment.

FIG. 19 is a schematic view of an image display device 500. The image display device 500 is described with reference to FIGS. 16 and 19.

The image display device 500 includes an illuminator 600 including a few laser sources 610r, 610g, 610b. The laser source 610r emits laser light LBr of the red hue. The laser source 610g emits laser light LBg of the green hue. The laser source 610b emits laser light LBb of the blue hue. In this embodiment, the laser source 610r is exemplified as the red laser source. The laser source 610g is exemplified as the green laser source. The laser source 610b is exemplified as the blue laser source.

In this embodiment, the wavelength conversion device 100 described in the context of the first embodiment is incorporated in the laser source 610g. Therefore, the laser source 610g may efficiently emit the laser light LBg.

The illuminator 600 further includes collimate lenses 620 in correspondence with the laser sources 610r, 610g, 610b. The collimate lens 620 situated near the laser source 610r changes the laser light LBr to a collimated beam. The collimate lens 620 situated near the laser source 610g changes the laser light LBg to a collimated beam. The collimate lens 620 situated near the laser source 610b changes the laser light LBb to a collimated beam.

The illuminator 600 includes a first dichroic mirror 631 configured to receive the laser lights LBg, LBb. The first dichroic mirror 631 transmits the laser light LBb but reflects the laser light LBg. Accordingly, the laser lights LBg, LBb are appropriately multiplexed.

The illuminator 600 further includes a second dichroic mirror 632 configured to receive the laser light LBr. The first dichroic mirror 631 reflects the laser light LBg toward the second dichroic mirror 632. The laser light LBb transmitted through the first dichroic mirror 631 also travels to the second dichroic mirror 632. The second dichroic mirror 632 reflects the laser lights LBg, LBb. On the other hand, the second dichroic mirror 632 transmits the laser light LBr. Accordingly, the laser lights LBr, LBg, LBb are multiplexed to become multiplexed laser light LB.

The image display device 500 includes a diffuser 510 configured to diffuse the multiplexed laser light LB, and a field lens 520. The field lens 520 changes the multiplexed laser light LB diffused by the diffuser 510 into substantially collimated illumination light CLB.

The image display device 500 further includes a beam splitter 530. The beam splitter 530 separates a beam according to a polarization direction.

The image display device 500 further includes a reflective liquid crystal panel 540 configured to spatially modulate the illumination light CLB in response to video signals. The illumination light CLB generated by the field lens 520 is reflected to the liquid crystal panel 540 by the beam splitter 530. Consequently, the liquid crystal panel 540 is appropriately illuminated by the illuminator 600. The liquid crystal panel 540 spatially modulates the illumination light CLB to create image light IL. The liquid crystal panel 540 includes a substantially rectangular light receiving surface 541. The illumination light CLB, which passes through the field lens 520 and the beam splitter 530 to illuminate the light receiving surface 541, has a substantially rectangular beam shape. In this embodiment, the liquid crystal panel 540 is exemplified as the spatial modulator.

The image display device 500 further includes a projection lens 550. The beam splitter 530 transmits the image light IL. Thereafter, the image light IL reaches the projection lens 550. The image light IL is projected through the projection lens 550 on a display surface such as a screen facing the image display device 500.

The beam shape of the image light IL generated by the liquid crystal panel 540 is rectangular. Therefore, images on the display surface become rectangular. In FIG. 19, the direction of the major axis of the projected image is represented by X axis. In FIG. 19, the direction of the minor axis of the projected image is represented by Y axis. In FIG. 19, the propagating direction of the image light IL is represented by Z axis.

X axis corresponds to the axis HA described with reference to FIG. 16. Y axis corresponds to the axis VA described with reference to FIG. 16. Z axis corresponds to the optical axis OA described with reference to FIG. 16. As described in the context of the first embodiment, the wavelength convertor 140 rotates around the axis VA corresponding to Y axis to adjust the angle $\theta$.

The aspect ratio between the major and minor axes of images projected from the image display device 500 may be 4:3 or 16:9, like general projectors and other display devices. In this embodiment, the illumination light CLB is rectangular. Therefore, there is little illumination loss on the liquid crystal panel 540. Therefore, the image display device 500 may generate the image light IL efficiently from the illumination light CLB.

Since the wavelength convertor 140 is rotated around the axis VA corresponding to Y axis, the rectangular beam shape of the illumination light CLB is easily created. Therefore, the image display device 500 may generate the image light IL efficiently from the illumination light CLB. Accordingly, the image display device 500 may project images under small power consumption.

The aforementioned embodiments are only examples of the wavelength conversion device and the image display device. Therefore, the aforementioned description does not limit an application range of the principles of the aforementioned embodiments. It should be easily understood that those skilled in the art may perform various modifications and combinations without departing from a scope and range of the aforementioned principles.

The aforementioned embodiments mainly include the following configurations.

A wavelength conversion device according to one aspect of the aforementioned embodiments includes: a light source configured to generate excitation light; a laser medium configured to generate fundamental light from the excitation light; a resonator mirror configured to form a resonator in cooperation with the laser medium; and a wavelength convertor configured to convert wavelength from the fundamental light into harmonic light. The wavelength convertor includes a first end surface inclined by an angle $\theta$ from a surface orthogonal to an optical axis of the resonator and a second end surface parallel to the first end surface. The angle $\theta$ satisfies a relationship represented by Formulas 1 to 5, which are described in the context of the aforementioned embodiments.

According to the aforementioned configuration, the excitation light generated by the light source becomes incident on the laser medium. The laser medium generates the fundamental light from the excitation light. The laser medium and the resonator mirror form a resonator for the fundamental light. The wavelength convertor converts wavelength from the fundamental light into the harmonic light. The wavelength convertor includes the first end surface inclined by the angle $\theta$ from a surface orthogonal to the optical axis of the resonator, and the second end surface parallel to the first end surface. The angle $\theta$ satisfies a relationship represented by Formulas 1 to 5, which are described in the context of the aforementioned embodiments. Therefore, fundamental light created by the wavelength convertor inversely converting the harmonic light is less likely to interfere with the fundamental light generated by the laser medium.

The fundamental light reflected on the first end surface of the wavelength convertor returns to the laser medium. Accordingly, there is little resultant loss from reflection of the fundamental light on the first end surface of the wavelength convertor. Therefore, the wavelength conversion device may very efficiently convert wavelength.

A wavelength conversion device according to another aspect of the aforementioned embodiments includes: a light source configured to generate excitation light; a laser medium configured to generate fundamental light from the excitation light; a resonator mirror configured to form a resonator for the fundamental light in cooperation with the laser medium; and a wavelength convertor configured to convert wavelength from the fundamental light into harmonic light. The wavelength convertor includes a first end surface inclined by an angle $\theta$ from a surface orthogonal to an optical axis of the resonator, and a second end surface parallel to the first end surface. The angle $\theta$ satisfies a relationship represented by Formulas 6 to 10, which are described in the context of the aforementioned embodiments.

According to the aforementioned configuration, the excitation light generated by the light source becomes incident on the laser medium. The laser medium generates the fundamental light from the excitation light. The laser medium and the resonator mirror form a resonator for the fundamental light. The wavelength convertor converts wavelength from the fundamental light into the harmonic light. The wavelength convertor includes the first end surface inclined by the angle $\theta$ from a surface orthogonal to the optical axis of the resonator and the second end surface parallel to the first end surface. The angle $\theta$ satisfies a relationship represented by Formulas 6 to 10, which are described in the context of the aforementioned embodiments. Therefore, the fundamental light created by the wavelength convertor inversely converting the harmonic light is less likely to interfere with the fundamental light generated by the laser medium.

The fundamental light reflected on the first end surface of the wavelength convertor returns to the laser medium. Accordingly, there is little resultant loss from reflection of the fundamental light on the first end surface of the wavelength convertor. Therefore, the wavelength conversion device may very efficiently convert wavelength.

In the aforementioned configuration, a spreading angle may be defined as a value of a half of full width at half maximum.

According to the aforementioned configuration, since the angle $\theta$ is set larger than the spreading angle defined as the value of a half of full width at half maximum, the fundamental light created by the wavelength convertor inversely converting the harmonic light is less likely to interfere with the fundamental light generated by the laser medium.

In the aforementioned configuration, the spreading angle may be no more than 0.2 degrees.

According to the aforementioned configuration, since the spreading angle is no more than 0.2 degrees, there is a decreased beam diameter of the fundamental light in the wavelength convertor. Accordingly, density of the fundamental light in the wavelength convertor increases. Wavelength conversion efficiency in the wavelength convertor is substantially proportional to the density of the fundamental light. Therefore, the wavelength conversion device may very efficiently convert wavelength.

In the aforementioned configuration, parallelism between the first and second end surfaces may be no more than 0.2 degrees.

According to the aforementioned configuration, since the parallelism between the first and second end surfaces is no more than 0.2 degrees, the effective etalon effect is obtained in the wavelength convertor. Transmission loss in the wavelength conversion device is largely reduced by the etalon effect. Therefore, even if a transmission film attached to the wavelength convertor has low transmittance, the wavelength convertor may achieve low transmission loss. Therefore, the wavelength conversion device may convert wavelength very efficiently.

An axis of the fundamental light under absence of the wavelength convertor substantially coincides with the major axis of the resonator. Since the parallelism between the first and second end surfaces is no more than 0.2 degrees, the axis of the fundamental light under presence of the wavelength convertor is substantially equivalent to the axis of the fundamental light under absence of the wavelength convertor translated from the major axis of the resonator. Since the angle $\theta$ satisfies the relationship defined by the aforementioned formulas, a translation amount between the fundamental lights under presence and absence of the wavelength convertor is very small. Therefore, the laser medium and the resonator mirror may be arranged in position even under absence of the wavelength convertor. Therefore, the wavelength conversion device may be easily assembled.

In the aforementioned configuration, the wavelength conversion device may further include transmission films formed on the first and second end surfaces. The transmission films may have transmittance no less than 99.7% for the fundamental light.

The etalon effect in the wavelength convertor greatly depends on transmittance of the fundamental light on the first and/or second end surfaces. According to the aforementioned configuration, since the transmission films formed on the first and second end surfaces have transmittance no less than 99.7% for the fundamental light, there are few differences in transmittance between wavelength transmitted through the wavelength convertor with transmission loss reduced by the etalon effect and wavelength less susceptible to the etalon effect. This means that reflected light due to the etalon effect in the wavelength convertor inclined by the angle $\theta$ becomes less influential. Since a power drop because of an inclination angle of the wavelength convertor is decreased, the wavelength convertor may convert wavelength very efficiently.

In the aforementioned configuration, the fundamental light may have an elliptical beam shape. The wavelength convertor may be inclined around the major axis of the elliptical beam shape.

According to the aforementioned configuration, since the fundamental light has the elliptical beam shape and the wavelength convertor is inclined around the major axis of the elliptical beam shape, the harmonic light propagating in an emitting direction is less likely to overlap with the harmonic light propagating in a return direction opposite to the emitting direction. Accordingly, inverse conversion from the harmonic light to the fundamental light is less likely to cause a power drop.

A beam shape of the harmonic light may be elliptical according to a beam shape of the excitation light or a position and inclination of the resonator mirror. If the wavelength convertor is inclined around the major axis, a difference in an optical path between the elliptical harmonic lights propagating in the emitting and return directions is formed with a smaller angle than inclination of the wavelength convertor around the minor axis. A setting range of the inclination angle of the wavelength convertor for creating the optical path difference between the harmonic lights propagating in the emitting and return directions is widened. Therefore, assembly costs for the wavelength conversion device are reduced.

In the aforementioned configuration, the wavelength convertor may include a polarization-reversed region. The first end surface may be inclined around an axis extending in a polarization reversal direction of the region.

According to the aforementioned configuration, since the wavelength convertor includes the polarization-reversed region, the wavelength of the fundamental light is appropriately converted into the harmonic light. The wavelength conversion efficiency of the wavelength convertor changes in the polarization reversal direction. Since the first end surface is inclined around the axis extending in the polarization reversal direction of the polarization-reversed region, a passing region of the fundamental light in the wavelength convertor is less likely to change in the polarization reversal direction. Therefore, the inclination of the wavelength convertor becomes less influential to the wavelength conversion efficiency. Consequently, the wavelength conversion device may convert wavelength very efficiently.

In the aforementioned configuration, the distance between the laser medium and the wavelength convertor may be no longer than 1 mm.

The wavelength conversion efficiency of the wavelength convertor is substantially proportional to density of the fundamental light. According to the aforementioned configuration, since the distance between the laser medium and the wavelength convertor is no longer than 1 mm, there is a decreased beam diameter of the fundamental light in the wavelength convertor. Since there is increased density of the fundamental light in the wavelength convertor, the wavelength conversion device may convert wavelength very efficiently.

Since the beam diameter of the fundamental light passing through the wavelength convertor is small, there is a decreased inclination angle of the wavelength convertor to form the optical path difference between the harmonic lights propagating in the emitting and return directions. Therefore, interference between the fundamental light generated by the laser medium and the fundamental light generated by the inverse conversion from the harmonic light is suitably prevented by the wavelength convertor inclined at the small angle. Therefore, the wavelength conversion device may convert wavelength very efficiently.

In the aforementioned configuration, the length of the resonator in the optical axis direction may be no longer than 10 mm.

According to the aforementioned configuration, since the length of the resonator in the optical axis direction is no longer than 10 mm, light reflected by the wavelength convertor is likely to return to the laser medium. Therefore, the wavelength conversion device may convert wavelength very efficiently.

In the aforementioned configuration, an angle between the wavelength convertor and the fundamental light may be the Brewster's angle.

According to the aforementioned configuration, since the angle between the wavelength convertor and the fundamental light is the Brewster's angle, the reflectance of light polarized in a specific direction becomes zero to cause little transmission loss of the fundamental light. Accordingly, loss in the resonator is reduced, irrespective of whether a transmission film for the fundamental light is formed on the wavelength convertor. Therefore, the wavelength conversion device may convert wavelength very efficiently.

In the aforementioned configuration, the wavelength convertor may be mechanically fixed so that rotation around an axis extending in a polarization direction of the fundamental light and rotation around the optical axis are restricted.

According to the aforementioned configuration, since the wavelength convertor is mechanically fixed to restrict the rotation around the axis extending in the polarization direction of the fundamental light and the rotation around the optical axis, the first end surface of the wavelength convertor is easily adjusted to the angle θ. Therefore, the wavelength conversion device is easily manufactured at low manufacturing costs.

An image display device according to another aspect of the embodiments includes: an illuminator including laser sources; and a spatial modulator illuminated by the illuminator to create image light. The laser sources include a red laser source configured to emit laser light of a red hue, a green laser source configured to emit laser light of a green hue, and a blue laser source configured to emit laser light of a blue hue. The green laser source includes the aforementioned wavelength conversion device.

According to the aforementioned configuration, the illuminator including the laser sources illuminates the spatial modulator. The spatial modulator creates image light using the light from the illuminator. The laser sources include the red laser source configured to emit the laser light of the red hue, the green laser source configured to emit the laser light of the green hue, and the blue laser source configured to emit the laser light of the blue hue. Therefore, the image display device may display color images with the three primary colors. The green laser source includes the wavelength conversion device. Therefore, the laser light of the green hue is generated very efficiently.

In the aforementioned configuration, the spatial modulator may be rectangular. The wavelength convertor may be inclined around the minor axis of the spatial modulator.

Since the wavelength convertor is inclined around the minor axis of the spatial modulator, the image display device may display a rectangular image very efficiently.

INDUSTRIAL APPLICABILITY

The principles of the aforementioned embodiments are suitably applied to a wavelength conversion device for very efficiently create high power light and an image display device for displaying an image with the light generated by the wavelength conversion device.

The invention claimed is:
1. A wavelength conversion device comprising:
a light source configured to generate excitation light;
a laser medium configured to generate fundamental light from the excitation light;
a resonator mirror configured to form a resonator for the fundamental light in cooperation with the laser medium; and
a wavelength convertor configured to convert wavelength from the fundamental light into harmonic light, wherein
the wavelength convertor includes a first end surface inclined by an angle θ from a surface orthogonal to an optical axis of the resonator and a second end surface parallel to the first end surface, and
the angle θ satisfies a relationship represented by Formulas 1 to 5 described below:

$$\text{Spreading Angle of Harmonic Light} < \theta < \theta 1 = \frac{1}{2}\tan^{-1}\left(\frac{\frac{\phi 1 + \phi 2}{2}}{L_1}\right) \quad [\text{Formula 1}]$$

where,
$L_1$: length of the laser medium in an optical axis direction, and $\phi 1$ and $\phi 2$ are defined by Formula 2:

$$\phi 1 = 2\sqrt{\left(\frac{\lambda}{2\pi}\right)\sqrt{4L(R-L)}} \quad [\text{Formula 2}]$$

$$\phi 2 = \phi 1 \sqrt{1 + \frac{2(L_1)^2}{\left(\frac{\pi n_0 \phi 1^2}{4\lambda}\right)^2}}$$

where,
$\lambda$: wavelength of the fundamental light,
L: resonator length,
$\pi$: circular constant,
R: curvature radius of the resonator mirror, and $n_0$ is defined by Formula 3:

$$n_0 = \frac{n'}{L'} \quad [\text{Formula 3}]$$

where n' is defined by Formula 4 and L' is defined by Formula 5:

$$n' = n_1 L_1 + n_2(L_2 - L_1) + \frac{L_2 - L_1}{\cos 2\theta} + \frac{L_1}{\cos\left\{\sin^{-1}\left(\frac{n_1}{n_2}\sin 2\theta\right)\right\}} \quad [\text{Formula 4}]$$

where,
$n_1$: refractive index of the laser medium,
$n_2$: refractive index between the laser medium and the wavelength convertor,
$L_2$: distance from the laser medium to the wavelength convertor, $$L' = L_2 + \frac{L_2 - L_1}{\cos 2\theta} + \frac{L_1}{\cos\left\{\sin^{-1}\left(\frac{n_1}{n_2}\sin 2\theta\right)\right\}}. \quad [\text{Formula 5}]$$

2. A wavelength conversion device comprising:

a light source configured to generate excitation light;

a laser medium configured to generate fundamental light from the excitation light;

a resonator mirror configured to form a resonator for the fundamental light in cooperation with the laser medium; and a wavelength convertor configured to convert wavelength from the fundamental light into harmonic light, wherein the wavelength convertor includes a first end surface inclined by an angle θ from a surface orthogonal to an optical axis of the resonator and a second end surface parallel to the first end surface, and the angle θ satisfies a relationship represented by Formulas 6 to 10 described below:

$$\text{Spreading Angle of Harmonic Light} < \theta < \theta1 = \frac{1}{2}\tan^{-1}\left(\frac{\frac{\phi1+\phi2}{2}}{n_1 L_1 + n_2 L_2}\right) \quad [\text{Formula 6}]$$

where, $L_1$: length of the laser medium in an optical axis direction, $L_2$: distance from the laser medium to the wavelength convertor, $n_1$: refractive index of the laser medium, $n_2$: refractive index between the laser medium and the wavelength convertor, and $\phi1$ and $\phi2$ are defined by Formula 7:

$$\phi1 = 2\sqrt{\left(\frac{\lambda}{2\pi}\right)\sqrt{4L_a(R - L_a)}} \quad [\text{Formula 7}]$$

$$\phi2 = \phi1 \sqrt{1 + \frac{\{2(n_1 L_1 + n_2 L_2)\}^2}{\left(\frac{\pi n_0 \phi 1^2}{4\lambda}\right)^2}}$$

where,

λ: wavelength of the fundamental light,

π: circular constant,

R: curvature radius of the resonator mirror, and $L_a$ and $n_0$ are defined by Formula 8:

$$L_a = n_1 L_1 + n_2 L_2 + n_3 L_3 + n_4 L_4 \quad [\text{Formula 8}]$$

$$n_0 = \frac{n'}{L'}$$

where, $L_3$: length of the wavelength convertor in the optical axis direction, $L_4$: distance from the wavelength convertor to the resonator mirror, $n_3$: refractive index of the wavelength convertor, $n_4$: refractive index between the wavelength convertor and the resonator mirror, and n' is defined by Formula 9 and L' is defined by Formula 10:

$$n' = n_1 L_1 + n_2 L_2 + \frac{n_3 L_2}{\cos 2\theta} + \frac{n_4 L_1}{\cos\left\{\sin^{-1}\left(\frac{n_1}{n_2}\sin 2\theta\right)\right\}} \quad [\text{Formula 9}]$$

$$L' = L_1 + L_2 + \frac{L_2}{\cos 2\theta} + \frac{L_1}{\cos\left\{\sin^{-1}\left(\frac{n_1}{n_2}\sin 2\theta\right)\right\}}. \quad [\text{Formula 10}]$$

3. The wavelength conversion device according to claim 1, wherein the spreading angle is defined as a value of a half of full width at half maximum.

4. The wavelength conversion device according to claim 1, wherein the spreading angle is no more than 0.2 degrees.

5. The wavelength conversion device according to claim 1, wherein parallelism between the first and second end surfaces is no more than 0.2 degrees.

6. The wavelength conversion device according to claim 1, further comprising transmission films formed on the first and second end surfaces, wherein the transmission films have transmittance no less than 99.7% for the fundamental light.

7. The wavelength conversion device according to claim 1, wherein the fundamental light has an elliptical beam shape, and the wavelength convertor is inclined around a major axis of the elliptical beam shape.

8. The wavelength conversion device according to claim 1, wherein the wavelength convertor includes a polarization-reversed region, and the first end surface is inclined around an axis extending in a polarization reversal direction of the region.

9. The wavelength conversion device according to claim 1, wherein a distance between the laser medium and the wavelength convertor is no longer than 1 mm.

10. The wavelength conversion device according to claim 1, wherein a length of the resonator in the optical axis direction is no longer than 10 mm.

11. The wavelength conversion device according to claim 1, wherein an angle between the wavelength convertor and the fundamental light is a Brewster's angle.

12. The wavelength conversion device according to claim 1, wherein the wavelength convertor is mechanically fixed so that rotation around an axis extending in a polarization direction of the fundamental light and rotation around the optical axis are restricted.

13. An image display device comprising:

an illuminator including laser sources; and a spatial modulator illuminated by the illuminator to create image light, wherein the laser sources include a red laser source configured to emit laser light of a red hue, a green laser source configured to emit laser light of a green hue, and a blue laser source configured to emit laser light of a blue hue, and the green laser source includes the wavelength conversion device according to claim 1.

14. The image display device according to claim 13, wherein the spatial modulator is rectangular, and the wavelength convertor is inclined around a minor axis of the spatial modulator.

* * * * *